(12) United States Patent
Fujiki et al.

(10) Patent No.: US 11,917,297 B2
(45) Date of Patent: Feb. 27, 2024

(54) IMAGING SUPPORT DEVICE, IMAGING APPARATUS, IMAGING SYSTEM, IMAGING SUPPORT SYSTEM, IMAGING SUPPORT METHOD, AND PROGRAM

(71) Applicant: FUJIFILM CORPORATION, Tokyo (JP)

(72) Inventors: Shinichiro Fujiki, Saitama (JP); Tetsuya Fujikawa, Saitama (JP); Junichi Tanaka, Saitama (JP); Atsushi Kawanago, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 123 days.

(21) Appl. No.: 17/728,992

(22) Filed: Apr. 26, 2022

(65) Prior Publication Data
US 2022/0256091 A1 Aug. 11, 2022

Related U.S. Application Data

(63) Continuation of application No. PCT/JP2020/039426, filed on Oct. 20, 2020.

(30) Foreign Application Priority Data

Oct. 29, 2019 (JP) .................................. 2019-196682

(51) Int. Cl.
*H04N 23/695* (2023.01)
*H04N 23/63* (2023.01)
(Continued)

(52) U.S. Cl.
CPC ......... *H04N 23/695* (2023.01); *F16M 11/126* (2013.01); *F16M 11/18* (2013.01); *H04N 23/633* (2023.01); *H04N 23/687* (2023.01)

(58) Field of Classification Search
CPC .. H04N 23/695; H04N 23/633; H04N 23/687; H04N 23/60; H04N 23/6812;
(Continued)

(56) References Cited

U.S. PATENT DOCUMENTS 4,705,374 A * 11/1987 Robings ............... H04N 5/2228
396/386
5,399,949 A 3/1995 Hidaka
(Continued)

FOREIGN PATENT DOCUMENTS

JP     H06-22181 A    1/1994
JP     H08-317424 A   11/1996
(Continued)

OTHER PUBLICATIONS

International Search Report issued in International Application No. PCT/JP2020/039426 dated Jan. 12, 2021.
(Continued)

*Primary Examiner* — Shahbaz Nazrul
(74) *Attorney, Agent, or Firm* — SOLARIS Intellectual Property Group, PLLC

(57) ABSTRACT

Provided is an imaging support device including an acquisition portion that acquires reversal information indicating that a revolution direction of an imaging apparatus that is caused to revolve about one axis out of a first axis and a second axis intersecting with the first axis as a central axis by a revolution mechanism enabling the imaging apparatus to revolve about each of the first axis and the second axis as the central axis is reversed, and a control portion that, in a case where the reversal information is acquired by the acquisition portion, performs a control of operating an adjustment portion capable of adjusting a position of a captured image obtained by imaging performed by the imaging apparatus.

21 Claims, 27 Drawing Sheets

(51) Int. Cl.
*H04N 23/68* (2023.01)
*F16M 11/12* (2006.01)
*F16M 11/18* (2006.01)

(58) Field of Classification Search
CPC .... H04N 23/67; H04N 23/685; F16M 11/126;
F16M 11/18; F16M 2200/041; F16M
2200/042; F16M 11/2014; F16M 13/02;
F16M 11/10; G03B 5/00; G03B 15/00;
G03B 17/02; G03B 17/18; G03B 17/56
See application file for complete search history.

(56) References Cited

U.S. PATENT DOCUMENTS

| | | | |
|---|---|---|---|
| 6,208,464 B1 | 3/2001 | Tsukamoto et al. | |
| 2009/0060485 A1* | 3/2009 | Takahashi | G03B 5/00 |
| | | | 396/55 |
| 2009/0232483 A1* | 9/2009 | Anshita | G03B 17/02 |
| | | | 359/557 |
| 2010/0309324 A1* | 12/2010 | Shirono | H04N 23/55 |
| | | | 348/208.11 |
| 2013/0170822 A1* | 7/2013 | Chan | G03B 5/00 |
| | | | 396/86 |
| 2015/0042828 A1* | 2/2015 | Wakamatsu | H04N 23/687 |
| | | | 348/208.4 |
| 2018/0054551 A1* | 2/2018 | Takahashi | H04N 5/2228 |

FOREIGN PATENT DOCUMENTS

| | | |
|---|---|---|
| JP | H11-337993 A | 12/1999 |
| JP | 2002-282165 A | 9/2002 |
| JP | 2010-237251 A | 10/2010 |

OTHER PUBLICATIONS

Written Opinion of the ISA issued in International Application No. PCT/JP2020/039426 dated Jan. 12, 2021.

* cited by examiner

[AT TIME OF REVERSAL]

[STOPPAGE STATE]

[DURING REVOLUTION]

[AT TIME OF REVERSAL]

[AT TIME OF REVERSAL]

IMAGING SUPPORT DEVICE, IMAGING APPARATUS, IMAGING SYSTEM, IMAGING SUPPORT SYSTEM, IMAGING SUPPORT METHOD, AND PROGRAM

CROSS-REFERENCE TO RELATED APPLICATIONS

This application is a continuation application of International Application No. PCT/JP2020/039426, filed Oct. 20, 2020, the disclosure of which is incorporated herein by reference in its entirety. Further, this application claims priority from Japanese Patent Application No. 2019-196682, filed Oct. 29, 2019, the disclosure of which is incorporated herein by reference in its entirety.

BACKGROUND

1. Technical Field

The present disclosure relates to an imaging support device, an imaging apparatus, an imaging system, an imaging support system, an imaging support method, and a program.

2. Related Art

JP1999-337993A (JP-H11-337993A) discloses an anti-vibration device comprising a shake detection unit that detects a shake amount of an optical device, a correction optical system that corrects an image shake caused by the shake of the optical device, a driving unit that includes an actuator and a transmission mechanism which transmits a motion of the actuator to the correction optical system, and moves the correction optical system along a predetermined axis in a plane orthogonal to an optical axis of the correction optical system, and a control unit that drives the driving unit such that a difference between the shake amount output from the shake detection unit and a position of the correction optical system is canceled, in which in a case where a direction in which the correction optical system is newly driven in order to cancel the difference is a direction opposite to a previous driving direction, the control unit drives the driving unit such that an engagement clearance of the transmission mechanism is buffered, and the difference is canceled.

JP2010-237251A discloses an imaging apparatus comprising an imaging unit that images a subject, an imaging direction moving unit that moves an imaging direction of the imaging unit, an imaging direction control unit that performs a movement control of the imaging direction moving unit, a shake information detection unit that detects a shake amount of the imaging unit, and a movement error calculation unit that calculates a movement error amount based on a movement angle of the imaging direction moving unit and the shake amount which is detected by the shake information detection unit and is exerted on the imaging unit.

JP1994-022181A (JP-H6-022181A) discloses a driving control device of a small pan head in which in the small pan head including a motor that drives two orthogonal driving shafts, and a position detector that detects a rotational position of the driving shafts, a microcomputer that determines whether or not the motor is overloaded based on a detection output of the position detector and a driving instruction signal and forcibly stops the motor when it is determined that the motor is overloaded is provided.

SUMMARY

One embodiment according to the disclosed technology provides an imaging support device, an imaging apparatus, an imaging system, an imaging support system, an imaging support method, and a program that can resolve misregistration of a captured image in a case where a revolution direction of the imaging apparatus by a revolution mechanism is reversed.

A first aspect according to the disclosed technology is an imaging support device comprising an acquisition portion that acquires reversal information indicating that a revolution direction of an imaging apparatus that is caused to revolve about one axis out of a first axis and a second axis intersecting with the first axis as a central axis by a revolution mechanism enabling the imaging apparatus to revolve about each of the first axis and the second axis as the central axis is reversed, and a control portion that, in a case where the reversal information is acquired by the acquisition portion, performs a control of operating an adjustment portion capable of adjusting a position of a captured image obtained by imaging performed by the imaging apparatus.

A second aspect according to the disclosed technology is the imaging support device according to the first aspect according to the disclosed technology, in which the revolution mechanism causes misregistration of the captured image due to movement, in accordance with the reversal of the revolution direction about the one axis as the central axis, of the other axis along the one axis.

A third aspect according to the disclosed technology is the imaging support device according to the second aspect according to the disclosed technology, in which the revolution mechanism includes a first revolution mechanism that enables the imaging apparatus to revolve about the first axis as the central axis, and a second revolution mechanism that enables the imaging apparatus to revolve about the second axis as the central axis, and the misregistration is misregistration that occurs due to mechanical displacement, accompanied by reversal of the imaging apparatus by one revolution mechanism out of the first revolution mechanism and the second revolution mechanism, of the other revolution mechanism in a direction of the central axis of the reversal.

A fourth aspect according to the disclosed technology is the imaging support device according to the third aspect according to the disclosed technology, in which the displacement is mechanical displacement that occurs due to a backlash of the one revolution mechanism accompanied by the reversal.

A fifth aspect according to the disclosed technology is the imaging support device according to any one of the second to fourth aspects according to the disclosed technology, in which the adjustment portion is a shake correction portion that corrects a shake occurring due to a vibration exerted on the imaging apparatus, and the control portion resolves the misregistration by operating the shake correction portion.

A sixth aspect according to the disclosed technology is the imaging support device according to the fifth aspect according to the disclosed technology, in which the control portion causes the shake correction portion to resolve the misregistration in accordance with a correction amount decided in accordance with an instruction received by a reception portion.

A seventh aspect according to the disclosed technology is the imaging support device according to the fifth or sixth aspect according to the disclosed technology, in which the control portion displays a correction amount required for resolving the misregistration by the shake correction portion on a display portion.

An eighth aspect according to the disclosed technology is the imaging support device according to any one of the fifth to seventh aspects according to the disclosed technology, in which the control portion controls the shake correction portion in accordance with a focal length of the imaging apparatus.

A ninth aspect according to the disclosed technology is the imaging support device according to any one of the fifth to eighth aspects according to the disclosed technology, in which the control portion resolves the misregistration by operating the shake correction portion in a case where a focal length of the imaging apparatus is greater than or equal to a reference value.

A tenth aspect according to the disclosed technology is the imaging support device according to any one of the fifth to ninth aspects according to the disclosed technology, in which the control portion derives an actual correction amount that is required for resolving the misregistration by the shake correction portion and corresponds to an imaging focal length used in imaging performed by the imaging apparatus, based on a reference correction amount required for resolving the misregistration by the shake correction portion in a reference focal length decided as a focal length as a reference of the imaging apparatus and correlation information indicating a correlation between a focal length of the imaging apparatus and sensitivity of the shake correction portion.

An eleventh aspect according to the disclosed technology is the imaging support device according to the tenth aspect, in which the control portion causes the shake correction portion to resolve the misregistration in accordance with the actual correction amount.

A twelfth aspect according to the disclosed technology is the imaging support device according to the tenth or eleventh aspect according to the disclosed technology, in which the actual correction amount is a value obtained by dividing the reference correction amount by a product of the sensitivity corresponding to the reference focal length and the sensitivity corresponding to the imaging focal length.

A thirteenth aspect according to the disclosed technology is the imaging support device according to any one of the fifth to twelfth aspects according to the disclosed technology, in which the shake correction portion is at least one of an optical shake correction mechanism or an electronic shake correction portion.

A fourteenth aspect according to the disclosed technology is the imaging support device according to the thirteenth aspect according to the disclosed technology, in which the optical shake correction mechanism is at least one of a lens moving type shake correction mechanism or an imaging element moving type shake correction mechanism.

A fifteenth aspect according to the disclosed technology is an imaging apparatus comprising the imaging support device according to any one of the first to fourteenth aspects according to the disclosed technology, and an imaging element, in which the imaging support device supports imaging for the imaging element.

A sixteenth aspect according to the disclosed technology is the imaging apparatus according to the fifteenth aspect according to the disclosed technology, in which the adjustment portion is a shake correction portion that corrects a shake occurring due to a vibration exerted on the imaging apparatus, and the imaging apparatus further includes a reception portion that receives an instruction for a correction amount required for adjusting the position of the captured image.

A seventeenth aspect according to the disclosed technology is the imaging apparatus according to the fifteenth or sixteenth aspect according to the disclosed technology, further comprising a display portion, and a display control portion that displays the correction amount required for adjusting the position of the captured image on the display portion.

An eighteenth aspect according to the disclosed technology is an imaging system comprising the imaging apparatus according to any one of the fifteenth to seventeenth aspects, and a control device that performs at least one of a control of displaying the captured image adjusted by the adjustment portion on a display portion or a control of storing image data indicating the captured image in a storage portion, under control of the control portion.

A nineteenth aspect according to the disclosed technology is an imaging support system comprising the imaging support device according to any one of the first to fourteenth aspects according to the disclosed technology, and the adjustment portion, in which the control portion included in the imaging support device controls the adjustment portion.

A twentieth aspect according to the disclosed technology is an imaging support method comprising acquiring reversal information indicating that a revolution direction of an imaging apparatus that is caused to revolve about one axis out of a first axis and a second axis intersecting with the first axis as a central axis by a revolution mechanism enabling the imaging apparatus to revolve about each of the first axis and the second axis as the central axis is reversed, and performing, in a case where the reversal information is acquired, a control of operating an adjustment portion capable of adjusting a position of a captured image obtained by imaging performed by the imaging apparatus.

A twenty-first aspect according to the disclosed technology is a program causing a computer to execute a process comprising acquiring reversal information indicating that a revolution direction of an imaging apparatus that is caused to revolve about one axis out of a first axis and a second axis intersecting with the first axis as a central axis by a revolution mechanism enabling the imaging apparatus to revolve about each of the first axis and the second axis as the central axis is reversed, and performing, in a case where the reversal information is acquired, a control of operating an adjustment portion capable of adjusting a position of a captured image obtained by imaging performed by the imaging apparatus.

BRIEF DESCRIPTION OF THE DRAWINGS

Exemplary embodiments of the technology of the disclosure will be described in detail based on the following figures, wherein.

DETAILED DESCRIPTION

An example of an embodiment according to the disclosed technology will be described in accordance with the appended drawings.

First, words used in the following description will be described.

CPU is an abbreviation for "Central Processing Unit". GPU is an abbreviation for "Graphics Processing Unit". ASIC is an abbreviation for "Application Specific Integrated Circuit". PLD is an abbreviation for "Programmable Logic Device". FPGA is an abbreviation for "Field-Programmable Gate Array". AFE is an abbreviation for "Analog Front End". DSP is an abbreviation for "Digital Signal Processor". SoC is an abbreviation for "System-on-a-chip". SSD is an abbreviation for "Solid State Drive". USB is an abbreviation for "Universal Serial Bus". HDD is an abbreviation for "Hard Disk Drive". EEPROM is an abbreviation for "Electrically Erasable and Programmable Read Only Memory". EL is an abbreviation for "Electro-Luminescence". A/D is an abbreviation for "Analog/Digital". I/F is an abbreviation for "Interface". UI is an abbreviation for "User Interface". WAN is an abbreviation for "Wide Area Network". ISP is an abbreviation for "Image Signal Processor". CMOS is an abbreviation for "Complementary Metal Oxide Semiconductor". CCD is an abbreviation for "Charge Coupled Device". SWIR is an abbreviation for "Short-Wavelength Infrared".

In the description of the present specification, "vertical" refers to being vertical in a sense of not only being completely vertical but also including an error generally allowed in the technical field to which the disclosed technology belongs. In the description of the present specification, "horizontal" refers to being horizontal in a sense of not only being completely horizontal but also including an error generally allowed in the technical field to which the disclosed technology belongs. In the description of the present specification, "parallel" refers to being parallel in a sense of not only being completely parallel but also including an error generally allowed in the technical field to which the disclosed technology belongs. In the description of the present specification, "perpendicular" refers to being perpendicular in a sense of not only being completely perpendicular but also including an error generally allowed in the technical field to which the disclosed technology belongs. In the description of the present specification, "same" refers to being the same in a sense of not only being completely the same but also including an error generally allowed in the technical field to which the disclosed technology belongs. In the description of the present specification, "coincidence" refers to coincidence in a sense of not only being completely coincident but also including an error generally allowed in the technical field to which the disclosed technology belongs.

First Embodiment

Figure 1:
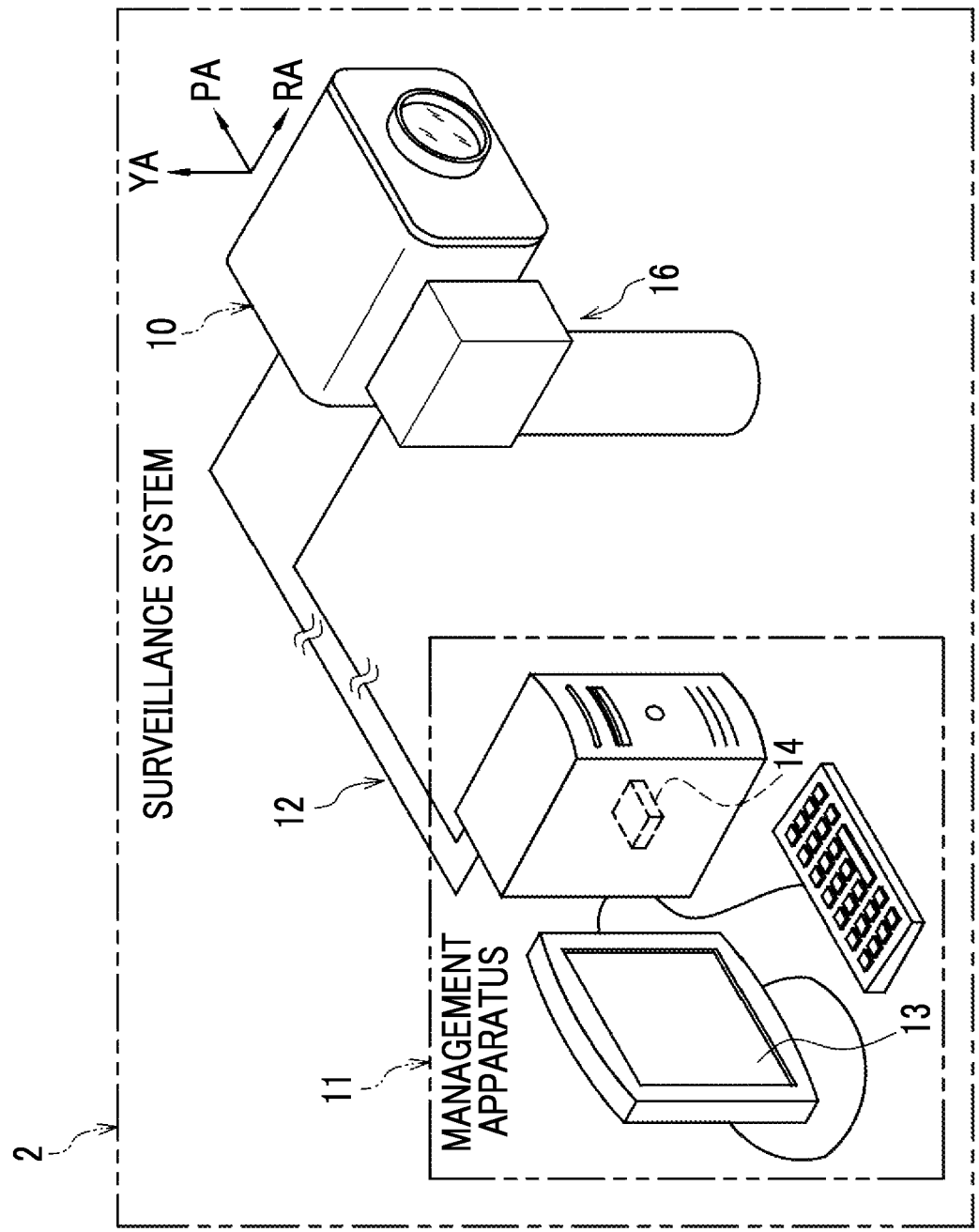
FIG. 1 is a schematic configuration diagram illustrating an example of a configuration of a surveillance system according to an embodiment.

As illustrated in FIG. 1 as an example, a surveillance system 2 comprises a surveillance camera 10 and a management apparatus 11. The surveillance system 2 is an example of an "imaging system" and an "imaging support system" according to the embodiment of the disclosed technology. The surveillance camera 10 is an example of an "imaging apparatus" according to the embodiment of the disclosed technology.

The surveillance camera 10 is installed in an indoor or outdoor post or wall, a part (for example, a rooftop) of a building, or the like through a revolution mechanism 16, described later, images a surveillance target that is a subject, and generates a motion picture image by the imaging. The motion picture image includes images of a plurality of frames obtained by imaging. The surveillance camera 10 transmits the motion picture image obtained by imaging to the management apparatus 11 through a communication line 12.

The management apparatus 11 comprises a display 13 and a secondary storage device 14. Examples of the display 13 include a liquid crystal display or an organic EL display. The display 13 is an example of a "display portion" according to the embodiment of the disclosed technology.

Examples of the secondary storage device 14 include an HDD. The secondary storage device 14 may be a non-volatile memory such as a flash memory, an SSD, or an EEPROM instead of the HDD. The secondary storage device 14 is an example of a "storage portion (storage device)" according to the embodiment of the disclosed technology.

In the management apparatus 11, the motion picture image transmitted by the surveillance camera 10 is received, and the received motion picture image is displayed on the display 13 or stored in the secondary storage device 14.

Figure 2:
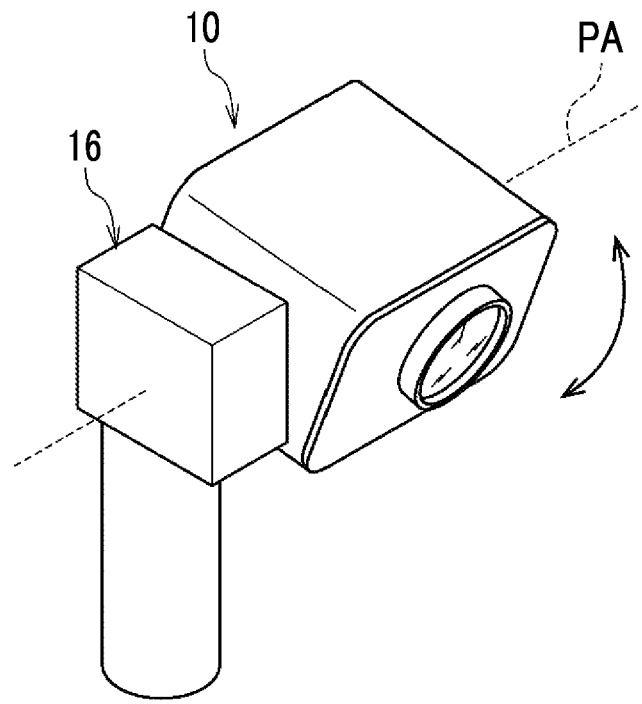
FIG. 2 is a perspective view illustrating an example of an exterior of a surveillance camera according to the embodiment.
Figure 3:
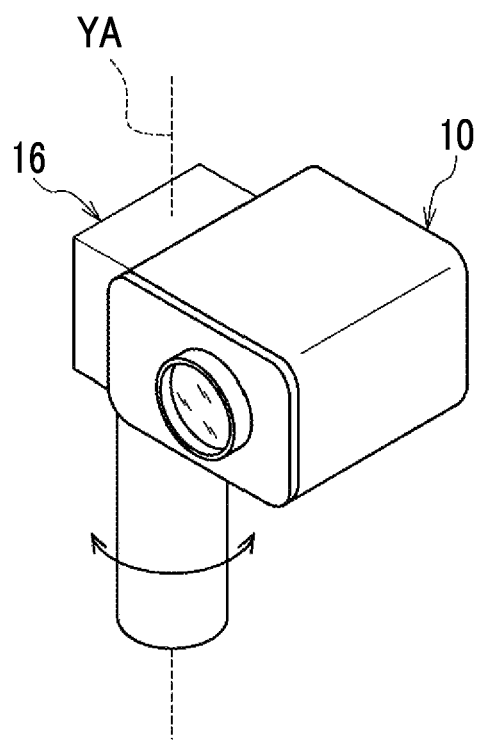
FIG. 3 is a perspective view illustrating an example of the exterior of the surveillance camera according to the embodiment.

The surveillance camera 10 is attached to the revolution mechanism 16. The revolution mechanism 16 enables the surveillance camera 10 to revolve. Specifically, the revolution mechanism 16 is a 2-axis revolution mechanism that enables the surveillance camera 10 to revolve about each of a first axis and a second axis intersecting with the first axis as a center axis. As illustrated in FIG. 2 as an example, the revolution mechanism 16 enables the surveillance camera 10 to revolve in a revolution direction of which a central axis is a pitch axis PA. In addition, as illustrated in FIG. 3 as an example, the revolution mechanism 16 enables the surveillance camera 10 to revolve in the revolution direction of which the central axis is a yaw axis YA. The revolution mechanism 16 is an example of a "revolution mechanism" according to the embodiment of the disclosed technology. In addition, the "pitch axis PA" is an example of a "first axis" according to the embodiment of the disclosed technology, and the "yaw axis YA" is an example of a "second axis" according to the embodiment of the disclosed technology. In the present embodiment, while the 2-axis revolution mechanism is illustrated as the revolution mechanism 16, the disclosed technology is not limited thereto. The disclosed technology is also established in a case where a 3-axis revolution mechanism is applied.

Figure 4:
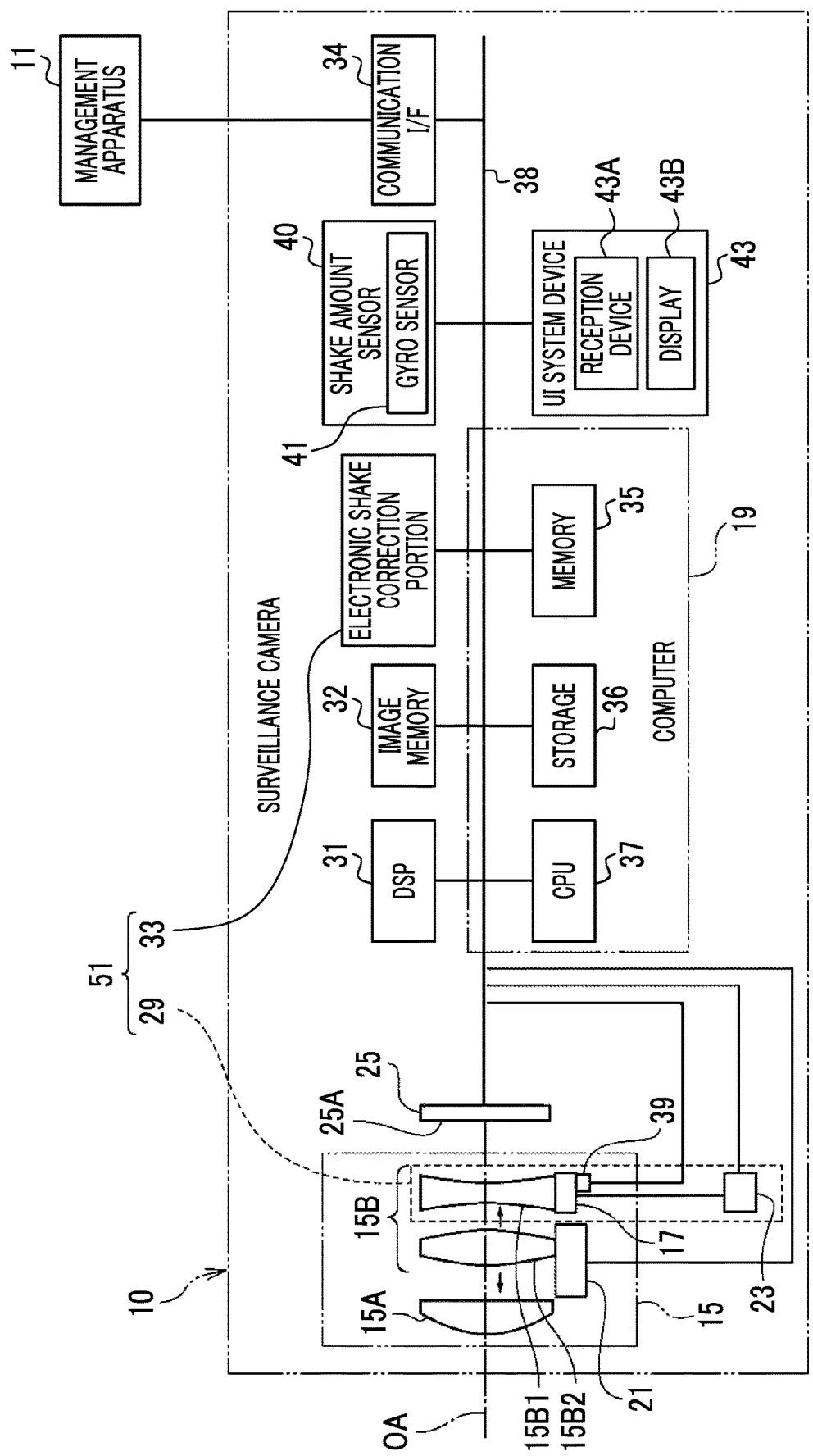
FIG. 4 is a block diagram illustrating an example of a configuration of an optical system and an electric system of the surveillance camera according to the embodiment.

As illustrated in FIG. 4 as an example, the surveillance camera 10 comprises an optical system 15 and an imaging element 25. The imaging element 25 is positioned on a rear stage of the optical system 15. The optical system 15 comprises an objective lens 15A and a lens group 15B. The objective lens 15A and the lens group 15B are arranged in an order of the objective lens 15A and the lens group 15B along an optical axis OA of the optical system 15 from the surveillance target side (object side) to a light-receiving surface 25A side (image side) of the imaging element 25. The lens group 15B includes a zoom lens 15B2 and the like. The zoom lens 15B2 is movably supported along the optical axis OA by a moving mechanism 21. The moving mechanism 21 moves the zoom lens 15B2 along the optical axis OA in accordance with motive power provided from a motor (not illustrated) for the zoom lens. In addition, the lens group 15B includes an anti-vibration lens 15B1. The anti-vibration lens 15B1 changes in a direction perpendicular to an optical axis of the anti-vibration lens 15B1 in accordance with the provided motive power.

By the optical system 15 configured in such a manner, an image of surveillance target light showing the surveillance target is formed on the light-receiving surface 25A. The imaging element 25 is an example of an "imaging element" according to the embodiment of the disclosed technology.

Examples of a vibration exerted on the surveillance camera 10 include, in a case of an outdoor space, a vibration caused by traffic of an automobile, a vibration caused by wind, a vibration caused by construction work, and the like and, in a case of an indoor space, a vibration caused by an operation of an air conditioner, a vibration caused by entrance and exit of a person, and the like. In addition, examples of the vibration exerted on the surveillance camera 10 include a vibration during revolution of the surveillance camera 10 by the revolution mechanism 16, a vibration in a case where a revolution operation performed by the revolution mechanism 16 is started or stopped, and the like. Thus, in the surveillance camera 10, a shake occurs due to the vibration exerted on the surveillance camera 10 (hereinafter, simply referred to as the "vibration").

In the present embodiment, the "shake" refers to a phenomenon in which a subject image on the light-receiving surface 25A changes due to a change in positional relationship between the optical axis OA and the light-receiving surface 25A in the surveillance camera 10. In other words, the "shake" is said to be a phenomenon in which an optical image obtained by forming the image on the light-receiving surface 25A changes by inclination of the optical axis OA due to the vibration exerted on the surveillance camera 10. For example, changing of the optical axis OA means inclination of the optical axis OA with respect to a reference axis (for example, the optical axis OA before the shake occurs). Hereinafter, the shake that occurs due to the vibration will be simply referred to as the "shake".

Therefore, the surveillance camera 10 comprises a shake correction portion 51. The shake correction portion 51 is an example of an "adjustment portion (adjustment component)" and a "shake correction component" according to the embodiment of the disclosed technology. The shake correction portion 51 includes a mechanical shake correction portion 29 and an electronic shake correction portion 33. The shake correction portion 51 corrects the shake occurring due to the vibration exerted on the surveillance camera 10. The mechanical shake correction portion 29 is a mechanism that corrects the shake by applying motive power generated by a driving source such as a motor (for example, a voice coil motor) to the anti-vibration lens to move the anti-vibration lens in a direction perpendicular to an optical axis of an imaging optical system. The electronic shake correction portion 33 corrects the shake by performing image processing on a captured image based on a shake amount. That is, the shake correction portion 51 mechanically or electronically corrects the shake using a hardware configuration and/or a software configuration. Here, mechanical correction of the shake refers to correction of the shake implemented by mechanically moving a shake correction element such as an anti-vibration lens and/or an imaging element using motive power generated by a driving source such as a motor (for example, a voice coil motor). Electronic correction of the shake refers to correction of the shake implemented by performing the image processing by a processor. In the present embodiment, "correction of the shake" includes a meaning of removing the shake and also a meaning of reducing the shake.

The mechanical shake correction portion 29 and the electronic shake correction portion 33 are an example of a "shake correction portion" according to the embodiment of the disclosed technology. The mechanical shake correction portion 29 is an example of an "optical shake correction mechanism" according to the embodiment of the disclosed technology.

The mechanical shake correction portion 29 comprises the anti-vibration lens 15B1, an actuator 17, a driver 23, and a position detection sensor 39.

Various well-known methods can be employed as a method of correcting the shake by the mechanical shake correction portion 29. In the present embodiment, a method of correcting the shake by moving the anti-vibration lens 15B1 based on the shake amount detected by a shake amount detection sensor 40 (described later) is employed as the method of correcting the shake. Specifically, the shake is corrected by moving the anti-vibration lens 15B1 in a direction of canceling the shake by an amount with which the shake is canceled.

The actuator 17 is attached to the anti-vibration lens 15B1. The actuator 17 is a shift mechanism in which a voice coil motor is mounted, and changes the anti-vibration lens 15B1 in the direction perpendicular to the optical axis of the anti-vibration lens 15B1 by driving the voice coil motor. Here, while the shift mechanism in which the voice coil motor is mounted is employed as the actuator 17, the disclosed technology is not limited thereto. Other motive power sources such as a stepping motor or a piezo element may be applied instead of the voice coil motor.

The actuator 17 is controlled by the driver 23. Driving the actuator 17 under control of the driver 23 mechanically changes a position of the anti-vibration lens 15B1 with respect to the optical axis OA.

The position detection sensor 39 detects the current position of the anti-vibration lens 15B1 and outputs a position signal indicating the detected current position. Here, a device including a hall element is employed as an example of the position detection sensor 39. Here, the current position of the anti-vibration lens 15B1 refers to the current position in a two-dimensional plane of the anti-vibration lens. The two-dimensional plane of the anti-vibration lens refers to a two-dimensional plane perpendicular to the optical axis of the anti-vibration lens 15B1. In the present embodiment, while the device including the hall element is employed as an example of the position detection sensor 39, the disclosed technology is not limited thereto. A magnetic sensor, a photosensor, or the like may be employed instead of the hall element.

The surveillance camera 10 comprises a computer 19, a DSP 31, an image memory 32, the electronic shake correction portion 33, a communication I/F 34, the shake amount detection sensor 40, and a UI system device 43. The computer 19 comprises a memory 35, a storage 36, and a CPU 37. The electronic shake correction portion 33 is an example of an "electronic shake correction portion" according to the embodiment of the disclosed technology. In addition, the computer 19 is an example of an "imaging support device" according to the embodiment of the disclosed technology. The memory 35 is an example of a "memory" according to the embodiment of the disclosed technology. The CPU 37 is an example of a "processor" according to the embodiment of the disclosed technology.

The imaging element 25, the DSP 31, the image memory 32, the electronic shake correction portion 33, the communication I/F 34, the memory 35, the storage 36, the CPU 37, the shake amount detection sensor 40, and the UI system device 43 are connected to a bus 38. In addition, the driver 23 is connected to the bus 38. In the example illustrated in FIG. 4, while one bus is illustrated as the bus 38 for convenience of illustration, a plurality of buses may be used. The bus 38 may be a serial bus or may be a parallel bus including a data bus, an address bus, a control bus, and the like.

The memory 35 temporarily stores various information and is used as a work memory. Examples of the memory 35 include a RAM. However, the disclosed technology is not limited thereto. A storage device of other types may be used. The storage 36 is a non-volatile storage device. Here, a flash memory is employed as an example of the storage 36. The flash memory is merely an example. Examples of the storage 36 include various non-volatile memories such as a magnetoresistive memory and/or a ferroelectric memory instead of the flash memory or together with the flash memory. In addition, the non-volatile storage device may be an EEPROM, an HDD, and/or an SSD or the like. The storage 36 stores various programs for the surveillance camera 10. The CPU 37 controls the entire surveillance camera 10 by reading out various programs from the storage 36 and executing the read various programs on the memory 35.

The imaging element 25 is a CMOS image sensor. The imaging element 25 images the surveillance target at a predetermined frame rate under an instruction of the CPU 37. Here, for example, the "predetermined frame rate" refers to a few tens of frames/second to a few hundred frames/second. The imaging element 25 may incorporate a control device (imaging element control device). In this case, the imaging element control device performs detailed controls inside imaging element 25 in accordance with an imaging instruction provided by the CPU 37. In addition, the imaging element 25 may image a target subject at the predetermined frame rate under an instruction of the DSP 31. In this case, the imaging element control device performs the detailed controls inside the imaging element 25 in accordance with the imaging instruction output by the DSP 31. The DSP 31 may be referred to as an ISP.

The light-receiving surface 25A is formed with a plurality of photosensitive pixels (not illustrated) arranged in a matrix. In the imaging element 25, photoelectric conversion is performed for each photosensitive pixel by exposing each photosensitive pixel. Charges obtained by performing the photoelectric conversion for each photosensitive pixel correspond to an analog imaging signal indicating the surveillance target. Here, a plurality of photoelectric conversion elements (for example, photoelectric conversion elements in which color filters are arranged) having sensitivity to visible light are employed as the plurality of photosensitive pixels. In the imaging element 25, a photoelectric conversion element having sensitivity to light of red (R) (for example, a photoelectric conversion element in which an R filter corresponding to R is arranged), a photoelectric conversion element having sensitivity to light of green (G) (for example, a photoelectric conversion element in which a G filter corresponding to G is arranged), and a photoelectric conversion element having sensitivity to light of blue (B) (for example, a photoelectric conversion element in which a B filter corresponding to B is arranged) are employed as the plurality of photoelectric conversion elements. In the surveillance camera 10, imaging based on the visible light (for example, light on a short wavelength side of less than or equal to approximately 700 nanometers) is performed using these photosensitive pixels. However, the present embodiment is not limited thereto. Imaging based on infrared light (for example, light on a long wavelength side of greater than approximately 700 nanometers) may be performed. In this case, a plurality of photoelectric conversion elements having sensitivity to the infrared light may be used as the plurality of photosensitive pixels. Particularly, for example, an InGaAs sensor and/or a type-2 quantum well (T2SL; Simulation of Type-II Quantum Well) sensor may be used for imaging for SWIR.

The imaging element 25 generates a digital image that is a digital imaging signal by performing signal processing such as A/D conversion on the analog imaging signal. The imaging element 25 is connected to the DSP 31 through the bus 38 and outputs the generated digital image to the DSP 31 in units of frames through the bus 38. Here, the digital image is an example of a "captured image" according to the embodiment of the disclosed technology.

Here, while the CMOS image sensor is illustratively described as an example of the imaging element 25, the disclosed technology is not limited thereto. A CCD image sensor may be applied as the imaging element 25. In this case, the imaging element 25 is connected to the bus 38 through an AFE (not illustrated) that incorporates a CCD driver. The AFE generates the digital image by performing the signal processing such as the A/D conversion on the analog imaging signal obtained by the imaging element 25 and outputs the generated digital image to the DSP 31. The CCD image sensor is driven by the CCD driver incorporated in the AFE. The CCD driver may be independently provided.

The DSP 31 performs various digital signal processing on the digital image. For example, the various digital signal processing refers to demosaicing, noise removal processing, gradation correction processing, and color correction processing.

The DSP 31 outputs the digital image after the digital signal processing to the image memory 32 for each frame. The image memory 32 stores the digital image from the DSP 31. Hereinafter, for convenience of description, the digital image stored in the image memory 32 will be referred to as the "captured image".

The shake amount detection sensor 40 is, for example, a device including a gyro sensor 41 and detects the shake amount of the surveillance camera 10. In other words, the shake amount detection sensor 40 detects the shake amount for each of a pair of axial directions. The gyro sensor 41 detects an amount of a rotational shake about each axis (refer to FIG. 1) of the pitch axis PA, the yaw axis YA, and a roll axis RA (axis parallel to the optical axis OA). The shake amount detection sensor 40 detects the shake amount of the surveillance camera 10 by converting the amount of the rotational shake about the pitch axis PA and the amount of the rotational shake about the yaw axis YA detected by the gyro sensor 41 into a shake amount in a two-dimensional plane parallel to the pitch axis PA and the yaw axis YA.

Here, while the gyro sensor 41 is illustrated as an example of the shake amount detection sensor 40, this is merely an example. The shake amount detection sensor 40 may be an acceleration sensor. The acceleration sensor detects the shake amount in the two-dimensional plane parallel to the pitch axis PA and the yaw axis YA. The shake amount detection sensor 40 outputs the detected shake amount to the CPU 37.

In addition, here, while an example of a form of detecting the shake amount by the shake amount detection sensor 40 that is a physical sensor is illustrated, the disclosed technology is not limited thereto. For example, a movement vector obtained by comparing captured images that are stored in the image memory 32 and are adjacent to each other in time series may be used as the shake amount. In addition, a finally used shake amount may be derived based on the shake amount detected by the physical sensor and the movement vector obtained by the image processing.

The CPU 37 acquires the shake amount detected by the shake amount detection sensor 40 and controls the mechanical shake correction portion 29 and the electronic shake correction portion 33 based on the acquired shake amount. The shake amount detected by the shake amount detection sensor 40 is used for correction of the shake by each of the mechanical shake correction portion 29 and the electronic shake correction portion 33.

The electronic shake correction portion 33 is a device including an ASIC. The electronic shake correction portion 33 corrects the shake by performing the image processing on the captured image in the image memory 32 based on the shake amount detected by the shake amount detection sensor 40. The mechanical shake correction portion 29 and the electronic shake correction portion 33 correct the shake in accordance with the shake amount detected by the shake amount detection sensor 40.

Here, while the device including the ASIC is illustrated as the electronic shake correction portion 33, the disclosed technology is not limited thereto. For example, a device including an FPGA or a PLD may be used. In addition, for example, the electronic shake correction portion 33 may be a device including a plurality out of the ASIC, the FPGA, and the PLD. In addition, a computer including a CPU, a storage, and a memory may be employed as the electronic shake correction portion 33. The number of CPUs may be singular or plural. In addition, the electronic shake correction portion 33 may be implemented by a combination of a hardware configuration and a software configuration.

The communication I/F 34 is, for example, a network interface and controls transfer of various information with respect to the management apparatus 11 through a network. Examples of the network include a WAN such as the Internet or a public communication network. Communication between the surveillance camera 10 and the management apparatus 11 is controlled.

The UI system device 43 comprises a reception device 43A and a display 43B. For example, the reception device 43A includes a hard key and a touch panel and receives various instructions from a user or the like of the surveillance system 2 (hereinafter, simply referred to as the "user or the like"). The CPU 37 acquires the various instructions received by the reception device 43A and operates in accordance with the acquired instructions.

The display 43B displays various information under control of the CPU 37. Examples of the various information displayed on the display 43B include contents of the various instructions received by the reception device 43A and the captured image.

Figure 5:
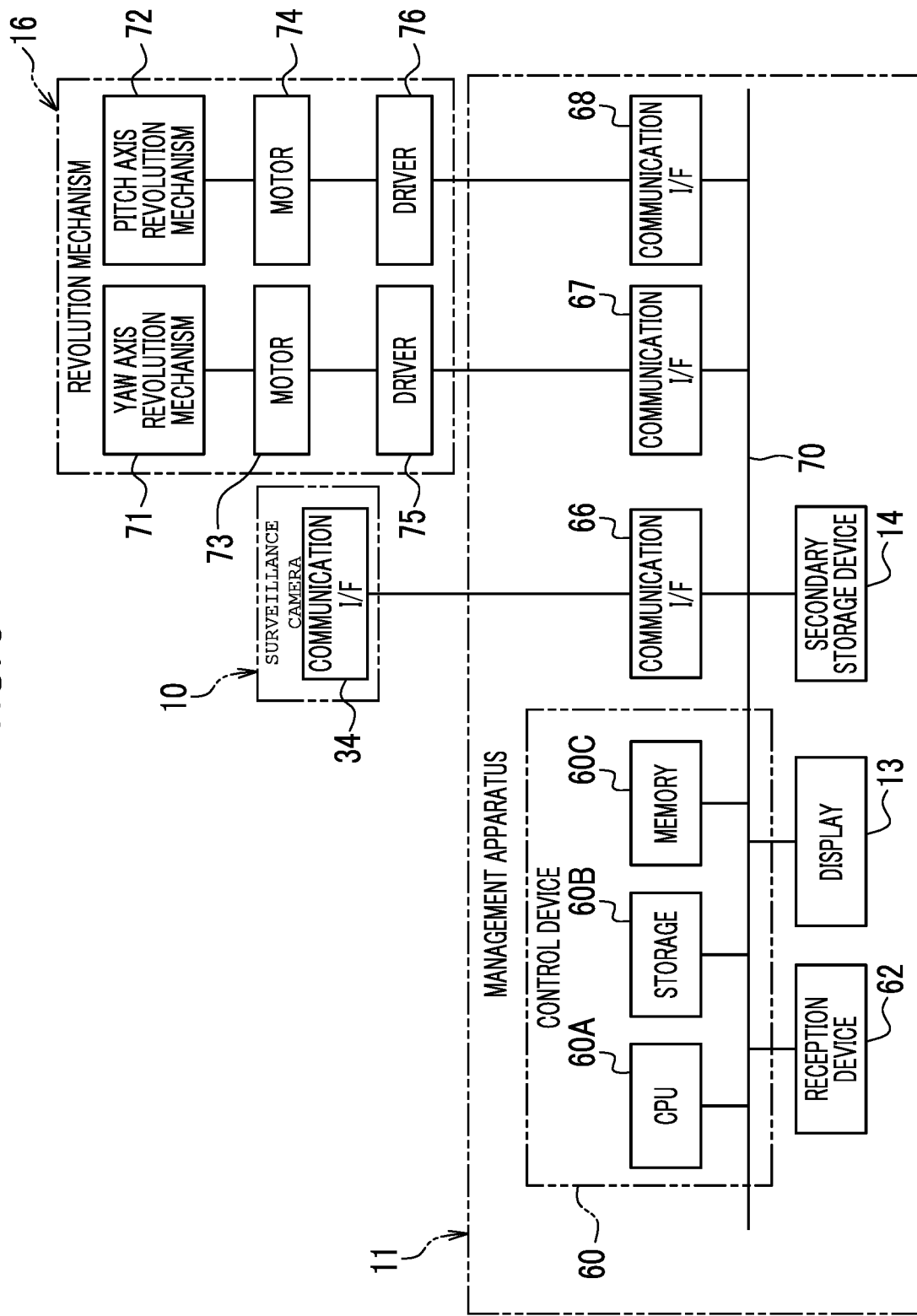
FIG. 5 is a block diagram illustrating an example of a configuration of an electric system of a management apparatus and a revolution mechanism according to the embodiment.

As illustrated in FIG. 5 as an example, the management apparatus 11 comprises the display 13, the secondary storage device 14, a control device 60, a reception device 62, and communication I/Fs 66 to 68. The control device 60 comprises a CPU 60A, a storage 60B, and a memory 60C. Each of the reception device 62, the display 13, the CPU 60A, the storage 60B, the memory 60C, and the communication I/Fs 66 to 68 is connected to a bus 70. In the example illustrated in FIG. 5, while one bus is illustrated as the bus 70 for convenience of illustration, a plurality of buses may be used. The bus 70 may be a serial bus or may be a parallel bus including a data bus, an address bus, a control bus, and the like.

The memory 60C temporarily stores various information and is used as a work memory. Examples of the memory 60C include a RAM. However, the disclosed technology is not limited thereto. A storage device of other types may be used. The storage 60B is a non-volatile storage device. Here, a flash memory is employed as an example of the storage 60B. The flash memory is merely an example. Examples of the storage 60B include various non-volatile memories such as a magnetoresistive memory and/or a ferroelectric memory instead of the flash memory or together with the flash memory. In addition, the non-volatile storage device may be an EEPROM, an HDD, and/or an SSD or the like. The storage 60B stores various programs for the management apparatus 11 (hereinafter, simply referred to as a "management apparatus program"). The CPU 60A controls the entire management apparatus 11 by reading out the management apparatus program from the storage 60B and executing the read management apparatus program on the memory 60C.

The communication I/F 66 is, for example, a network interface. The communication I/F 66 is communicably connected to the communication I/F 34 of the surveillance camera 10 through a network and controls transfer of various information with respect to the surveillance camera 10. For example, the communication I/F 66 requests the surveillance camera 10 to transmit the captured image and receives the captured image transmitted from the communication I/F 34 of the surveillance camera 10 in response to the request for transmission of the captured image.

The communication I/Fs 67 and 68 are, for example, network interfaces. The communication I/F 67 is communicably connected to the driver 75 through a network. The CPU 60A controls a revolution operation of the yaw axis revolution mechanism 71 by controlling the motor 73 through the communication I/F 67 and the driver 75. The communication I/F 68 is communicably connected to the driver 76 through a network. The CPU 60A controls a revolution operation of the pitch axis revolution mechanism 72 by controlling the motor 74 through the communication I/F 68 and the driver 76.

The reception device 62 includes, for example, a keyboard, a mouse, and a touch panel and receives various instructions from the user or the like. The CPU 60A acquires the various instructions received by the reception device 62 and operates in accordance with the acquired instructions.

The display 13 displays various information under control of the CPU 60A. Examples of the various information displayed on the display 13 include contents of the various instructions received by the reception device 62 and the captured image received by the communication I/F 66.

The secondary storage device 14 stores various information under control of the CPU 60A. Examples of the various information stored in the secondary storage device 14 include the captured image received by the communication I/F 66.

In such a manner, the control device 60 performs a control of displaying the captured image received by the communication I/F 66 on the display 13 and a control of storing the captured image received by the communication I/F 66 in the secondary storage device 14. The captured image displayed on the display 13 is an example of an "image adjusted by the adjustment portion (adjustment component)" according to the embodiment of the disclosed technology. In addition, the captured image stored in the secondary storage device 14 is an example of "image data" according to the embodiment of the disclosed technology.

Here, while the captured image is displayed on the display 13, and the captured image received by the communication I/F 66 is stored in the secondary storage device 14, the disclosed technology is not limited thereto. For example, any of the display of the captured image on the display 13 and the storage of the captured image in the secondary storage device 14 may be performed.

As illustrated in FIG. 5 as an example, the revolution mechanism 16 comprises a yaw axis revolution mechanism 71, a pitch axis revolution mechanism 72, a motor 73, a motor 74, a driver 75, and a driver 76. The yaw axis revolution mechanism 71 causes the surveillance camera 10 to revolve in the yaw direction. The motor 73 is driven to generate motive power under control of the driver 75. The yaw axis revolution mechanism 71 causes the surveillance camera 10 to revolve in the yaw direction by receiving the motive power generated by the motor 73. The motor 74 is driven to generate motive power under control of the driver 76. The pitch axis revolution mechanism 72 causes the surveillance camera 10 to revolve in the pitch direction by receiving the motive power generated by the motor 74.

Figure 6A:
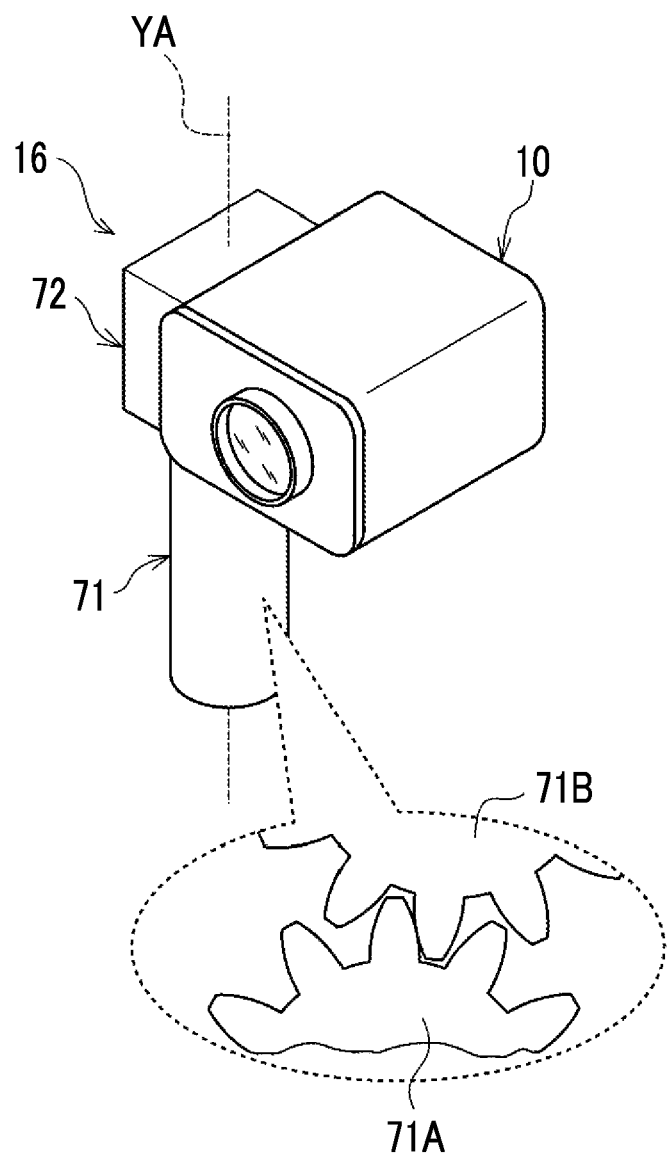
FIG. 6A is a conceptual diagram for describing misregistration occurring in the surveillance camera according to the embodiment.
Figure 6B:
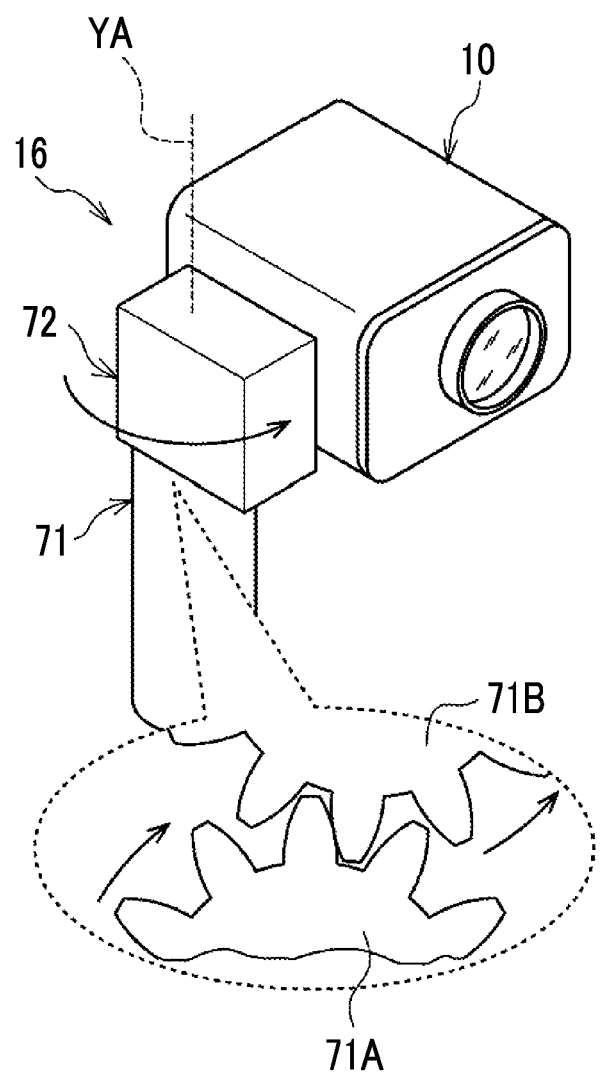
FIG. 6B is a conceptual diagram for describing the misregistration occurring in the surveillance camera according to the embodiment.

When the surveillance camera 10 attached to the 2-axis revolution mechanism is revolving about one axis as the central axis, the revolution direction may be reversed. Specifically, the surveillance camera 10 revolves about the yaw axis YA as the central axis as illustrated in FIG. 6B as an example from a stoppage state before the surveillance camera 10 revolves (hereinafter, simply referred to as the stoppage state) as illustrated in FIG. 6A as an example. At this point, in the yaw axis revolution mechanism 71, a driving gear 71A and a passive gear 71B mesh with each other, and motive power from a driving source (not illustrated) such as a motor is transmitted to the yaw axis revolution mechanism 71.

Figure 6C:
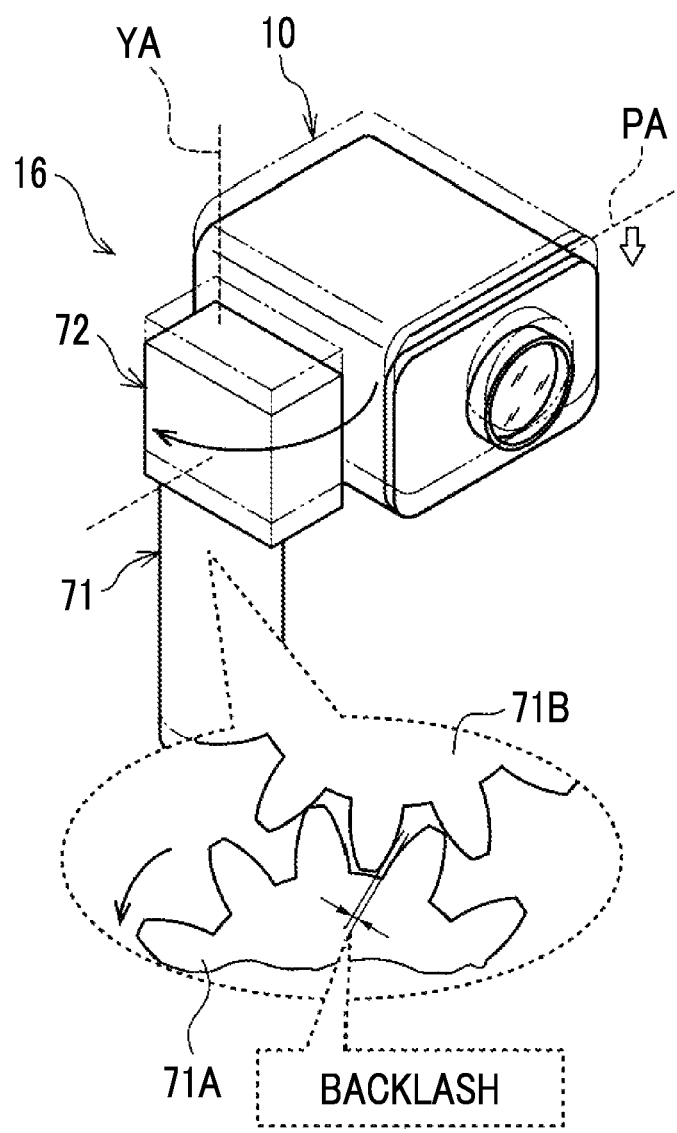
FIG. 6C is a conceptual diagram for describing the misregistration occurring in the surveillance camera according to the embodiment.

Then, as illustrated in FIG. 6C as an example, the revolution direction of the surveillance camera 10 is reversed. At this point, an effect of displacement occurring in the yaw axis revolution mechanism 71 that is performing the revolution operation may be mechanically transmitted to the pitch axis revolution mechanism 72. Consequently, mechanical displacement occurs in the pitch axis revolution mechanism 72. As an example of the mechanical displacement occurring in the pitch axis revolution mechanism 72, specifically, in a case where the revolution direction of the surveillance camera 10 is reversed, a rotation direction of the driving gear 71A of the yaw axis revolution mechanism 71 is also reversed inside the yaw axis revolution mechanism 71. A clearance between cogs of gears, that is, a backlash, is present between the driving gear 71A and the passive gear 71B. Thus, the passive gear 71B is temporarily separated from the driving gear 71A immediately after the driving gear 71A is reversed (for example, at a timing at which cogs of the driving gear 71A are separated from cogs of the passive gear 71B).

In addition, inertia in the revolution direction before the reversal occurs in the passive gear 71B. Thus, the passive gear 71B moves in the previous revolution direction (that is, a direction opposite to the revolution direction after the reversal) by an amount corresponding to the backlash. At this point, mechanical displacement of the passive gear 71B in a direction along the yaw axis YA also occurs. However, the displacement amount is not constant every time and may vary.

In such a manner, in the reversal of the revolution direction, the passive gear 71B loses support through the driving gear 71A and is displaced. That is, a supported state of the passive gear 71B by the driving gear 71A is released. Accordingly, the passive gear 71B is displaced in a direction of the yaw axis YA. That is, the mechanical displacement occurs in an internal mechanism (here, as an example, a mechanism including the passive gear 71B) of the yaw axis revolution mechanism 71. Furthermore, the effect of the displacement occurring in the yaw axis revolution mechanism 71 is transmitted to the pitch axis revolution mechanism 72 through a part connected to the yaw axis revolution mechanism 71.

The revolution mechanism 16 causes misregistration of the captured image (hereinafter, simply referred to as the "misregistration") due to movement, in accordance with the reversal of the revolution direction about one axis as the central axis, of the other axis along the one axis.

Figure 7A:
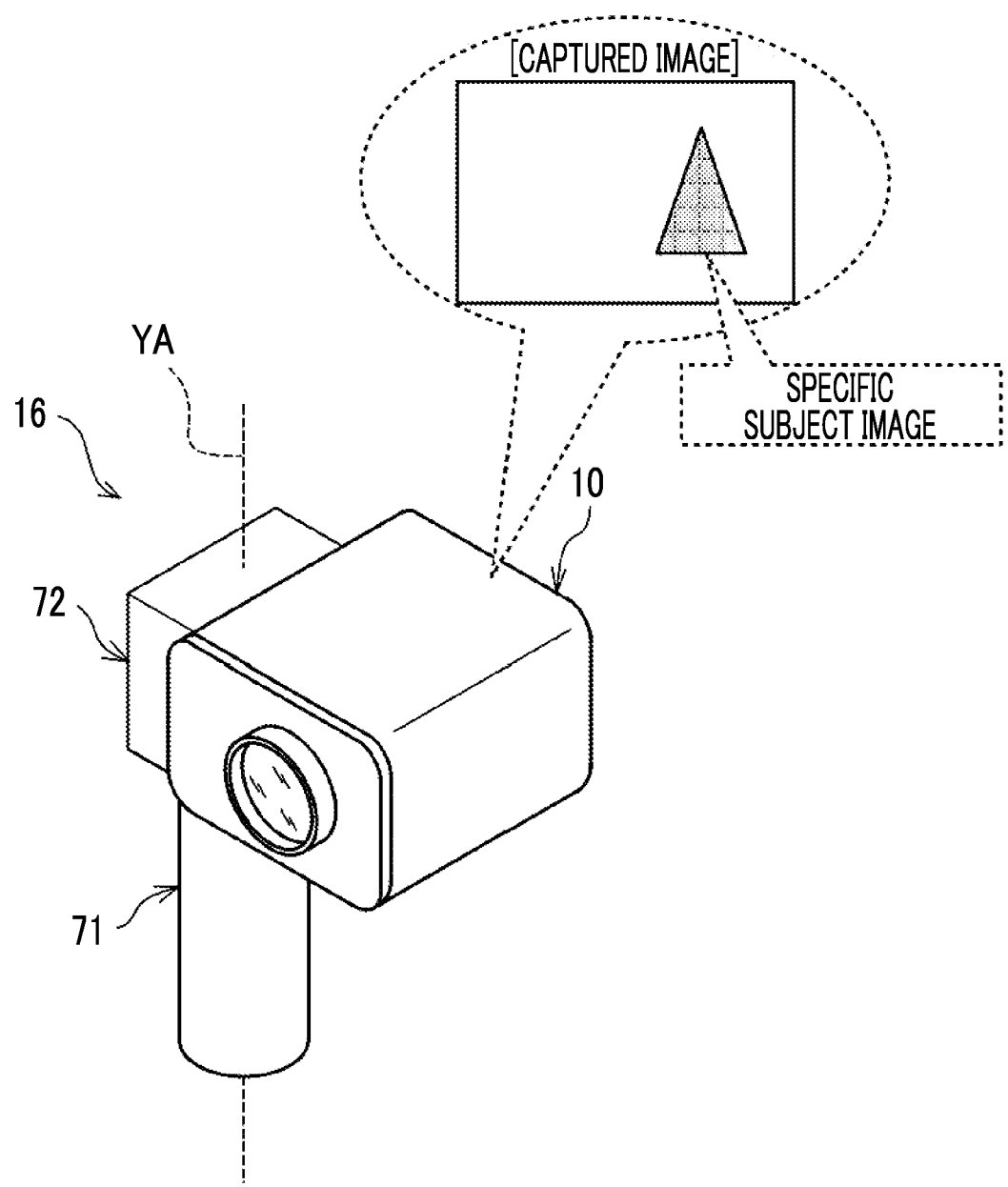
FIG. 7A is a conceptual diagram for describing the misregistration occurring in the surveillance camera according to the embodiment.
Figure 7B:
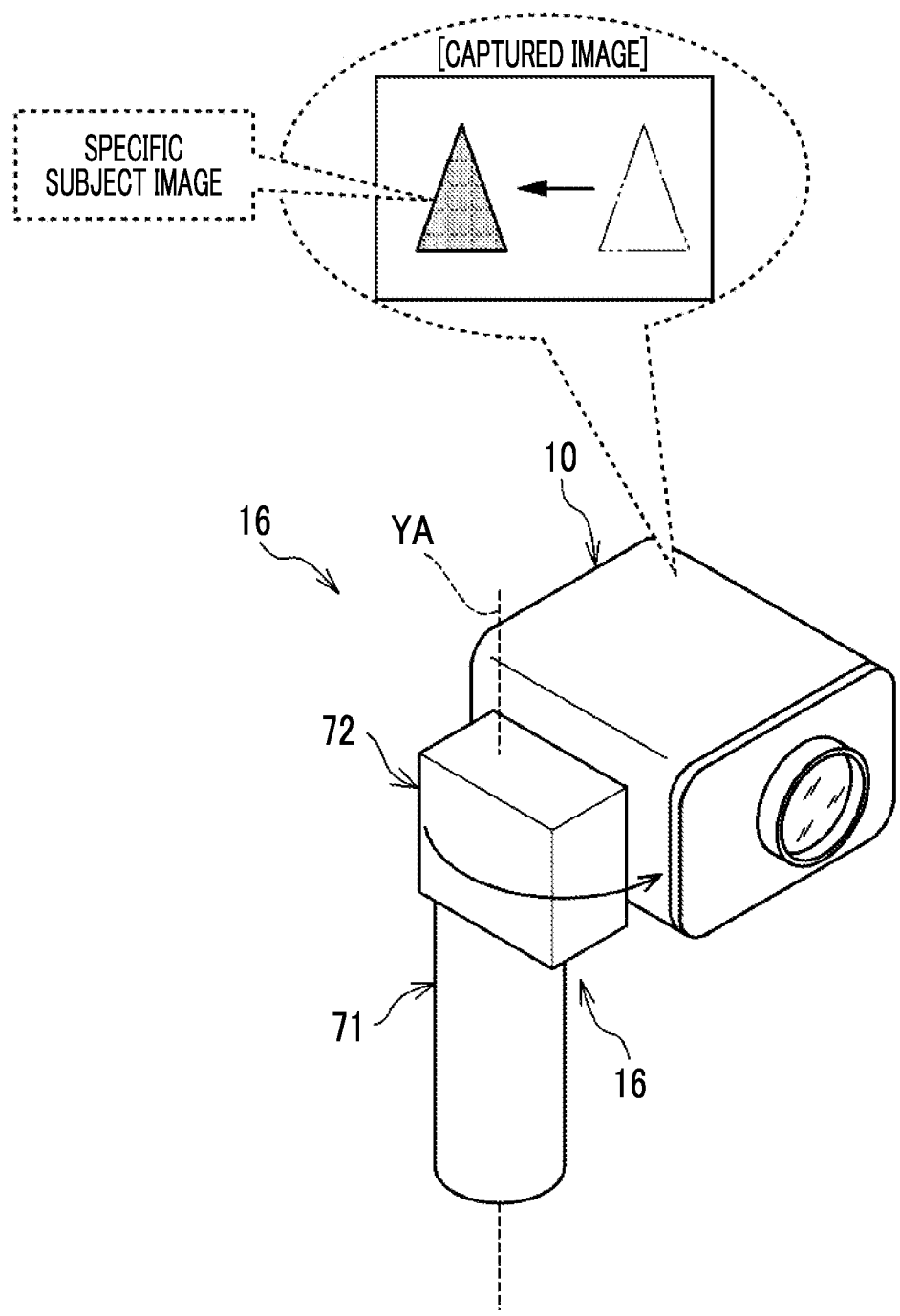
FIG. 7B is a conceptual diagram for describing the misregistration occurring in the surveillance camera according to the embodiment.
Figure 7C:
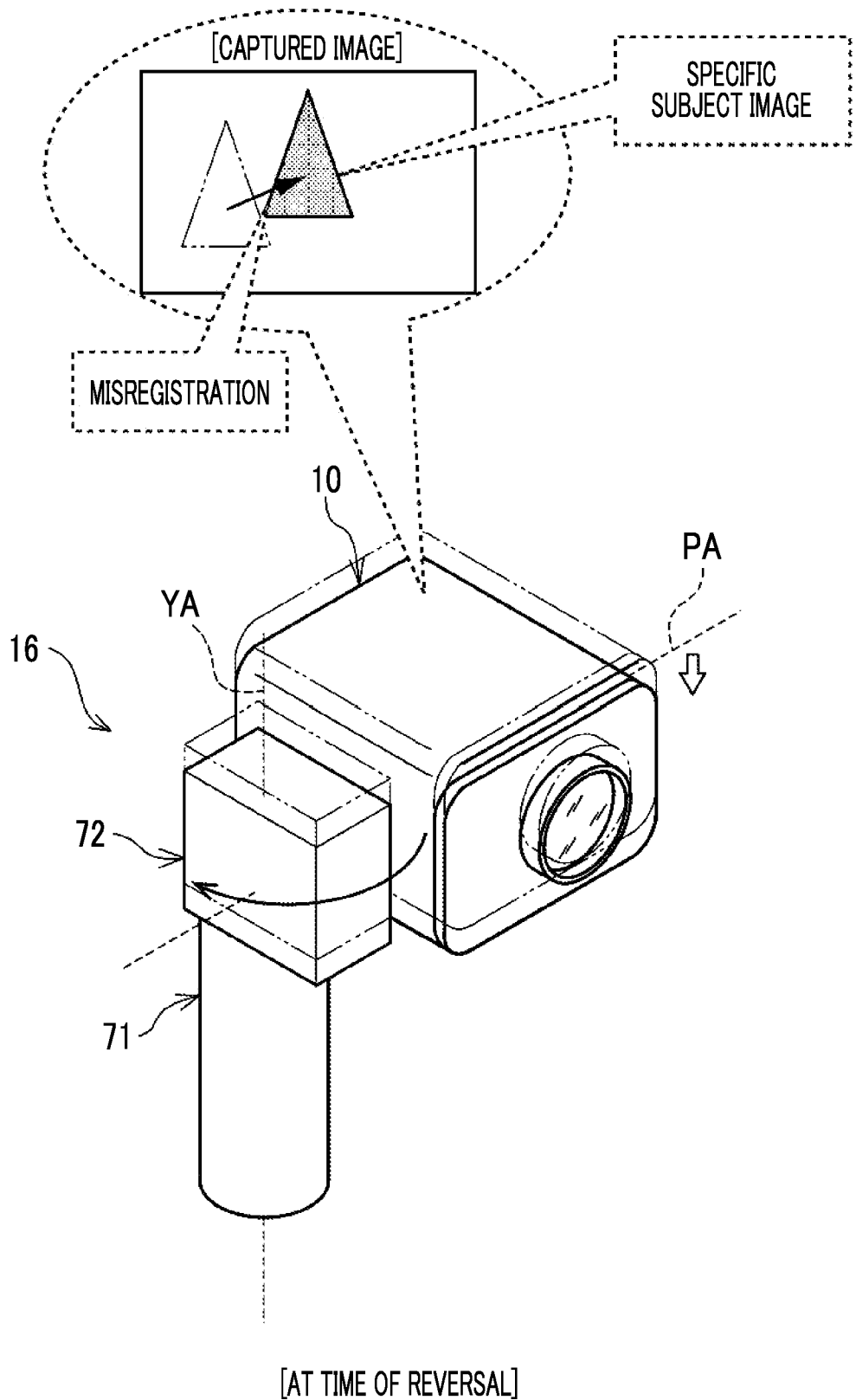
FIG. 7C is a conceptual diagram for describing the misregistration occurring in the surveillance camera according to the embodiment.

In a case where the surveillance camera 10 revolves about the yaw axis YA as the central axis as illustrated in FIG. 7B from the stoppage state illustrated in FIG. 7A as an example, a position of a specific subject (a specific person and/or object or the like) image moves in the captured image. Then, as illustrated in FIG. 7C as an example, the mechanical displacement due to the backlash occurs in the yaw axis revolution mechanism 71 as described above in accordance with the reversal of the revolution direction about the yaw axis YA as the central axis. Furthermore, the effect of the mechanical displacement of the yaw axis revolution mechanism 71 is transmitted to the pitch axis revolution mechanism 72. Consequently, the pitch axis revolution mechanism 72 is displaced along the yaw axis YA that is the central axis of the revolution direction. Accordingly, the surveillance camera 10 is also displaced along the yaw axis YA. That is, the pitch axis PA of the surveillance camera 10 is displaced along the yaw axis YA. Consequently, the misregistration of the captured image in the direction of the yaw axis YA occurs. That is, in a case where the pitch axis PA of the surveillance camera 10 is displaced along the yaw axis YA, a position of the entire captured image is shifted in the direction of the yaw axis YA. Since the position of the entire captured image is shifted in the direction of the yaw axis YA, the position of the specific subject image is also consequently shifted in the direction of the yaw axis YA. In addition, as described above, the displacement amount of the misregistration in the direction of the yaw axis YA is not constant every time and may vary.

Figure 8:
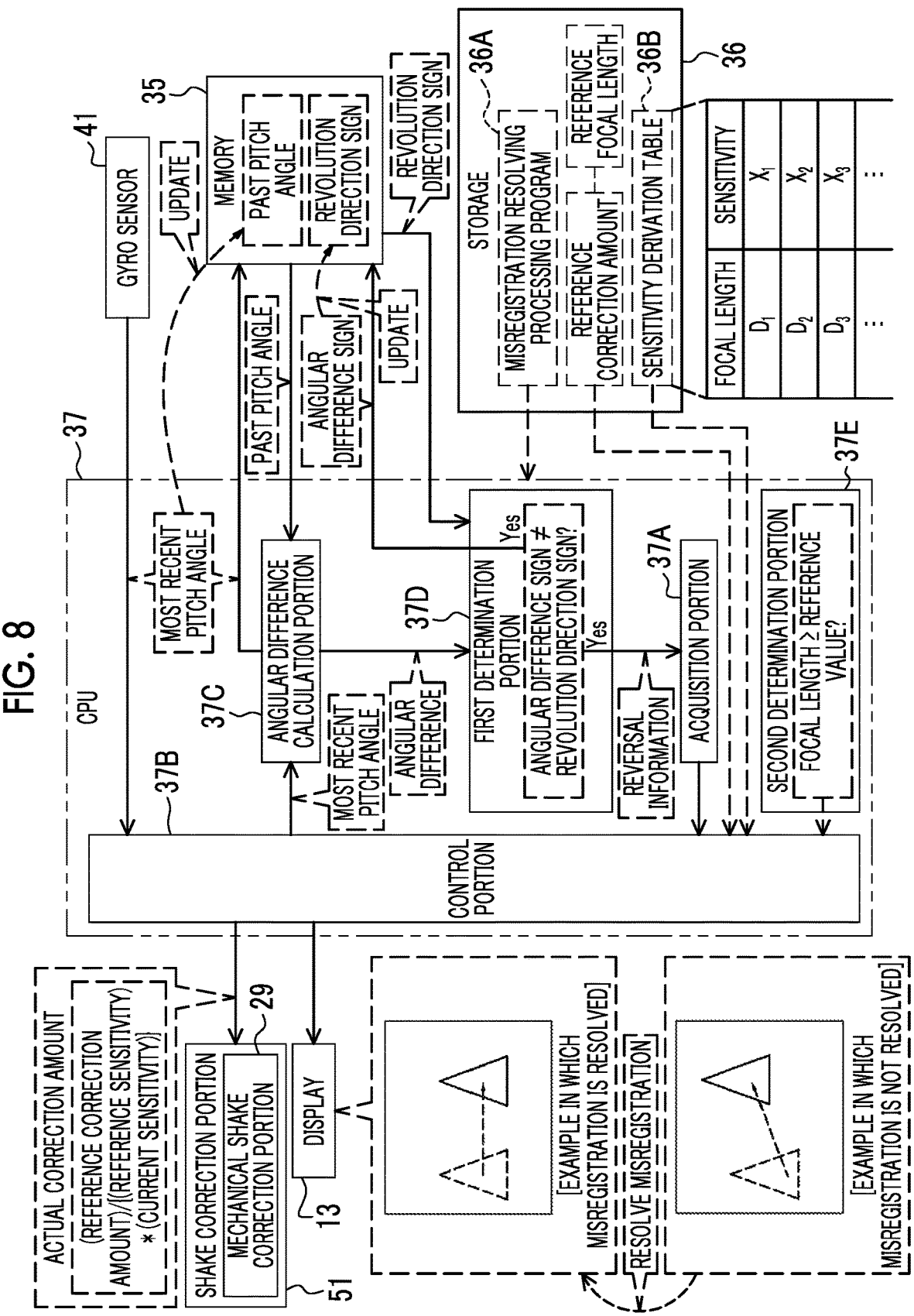
FIG. 8 is a function block diagram illustrating an example of functions of a CPU included in the surveillance camera according to the embodiment.

Therefore, in order to resolve the misregistration when the revolution direction of the surveillance camera 10 is reversed, as illustrated in FIG. 8 as an example, the storage 36 stores a misregistration resolving processing program 36A, and the misregistration resolving processing program 36A is executed by the CPU 37. Specifically, the CPU 37 reads out the misregistration resolving processing program 36A from the storage 36. Furthermore, the CPU 37 functions as an imaging support device that supports imaging performed by the surveillance camera 10 including the imaging element 25, by executing the read misregistration resolving processing program 36A on the memory 35. In such a manner, by functioning as the imaging support device, the CPU 37 supports imaging under a state where the revolution direction of the surveillance camera 10 is reversed.

The CPU 37 operates as an acquisition portion 37A, a control portion 37B, an angular difference calculation portion 37C, a first determination portion 37D, and a second determination portion 37E. The acquisition portion 37A is an example of an "acquisition portion" according to the embodiment of the disclosed technology. In addition, the control portion 37B is an example of a "control portion" according to the embodiment of the disclosed technology.

The control portion 37B acquires a pitch angle most recently output from the gyro sensor 41 (hereinafter, referred to as the "most recent pitch angle"). The control portion 37B outputs the most recent pitch angle acquired from the gyro sensor 41 to the angular difference calculation portion 37C. In addition, the control portion 37B updates a value of the pitch angle already stored in the memory 35 (hereinafter, referred to as the "past pitch angle") to a value of the most recent pitch angle acquired from the gyro sensor 41.

The angular difference calculation portion 37C acquires the value of the most recent pitch angle output from the control portion 37B. In addition, the angular difference calculation portion 37C acquires the value of the past pitch angle from the memory 35. The angular difference calculation portion 37C calculates an angular difference between the most recent pitch angle and the past pitch angle. Here, the angular difference refers to a value obtained by subtracting the value of the past pitch angle from the value of the most recent pitch angle. The angular difference calculation portion 37C outputs the angular difference to the first determination portion 37D.

The memory 35 stores the past pitch angle and a revolution direction sign that is a sign of the revolution direction of the surveillance camera 10. The revolution direction sign is a sign of any of "positive" and "negative". In an initial setting state of the surveillance camera 10, the memory 35 stores "0 degrees" as the past pitch angle and stores the sign of "positive" as the revolution direction sign. The value of the past pitch angle in the memory 35 is updated by the angular difference calculation portion 37C, and the revolution direction sign in the memory 35 is updated by the first determination portion 37D. For example, the value of the past pitch angle in the memory 35 is updated to the value of the most recent pitch angle each time the most recent pitch angle is acquired by the angular difference calculation portion 37C. In addition, the revolution direction sign in the memory 35 is updated to a sign of the most recent angular difference by the first determination portion 37D in a case where the revolution direction sign is different from the sign of the most recent angular difference calculated by the angular difference calculation portion 37C.

The first determination portion 37D determines whether or not an angular difference sign input from the angular difference calculation portion 37C and the revolution direction sign in the memory 35 are the same. In a case where the angular difference sign and the revolution direction sign are not the same, the first determination portion 37D outputs reversal information indicating that the revolution direction of the surveillance camera 10 is reversed to the acquisition portion 37A.

The reversal information is input into the acquisition portion 37A from the first determination portion 37D. That is, the acquisition portion 37A acquires the reversal information from the first determination portion 37D. In a case where the reversal information is acquired by the acquisition portion 37A, the control portion 37B performs a control of operating the shake correction portion 51. Under control of the control portion 37B, the shake correction portion 51 operates as an adjustment portion that can adjust a position of the captured image obtained by imaging performed by the surveillance camera 10. Specifically, the control portion 37B resolves the misregistration by operating the shake correction portion 51.

In the surveillance camera 10, in a case where a focal length is greater than or equal to a reference value, a change in position of the captured image is increased compared to a case where the focal length is less than the reference value. Therefore, the control portion 37B controls the shake correction portion 51 in accordance with the focal length of the surveillance camera 10. Specifically, the control portion 37B resolves the misregistration of the captured image accompanied by the reversal of the revolution direction by operating the shake correction portion 51 in a case where the focal length of the surveillance camera 10 is greater than or equal to the reference value. The reference value may be a fixed value or a variable value that is changed in accordance with an instruction received by the reception device 43A and/or 62, an imaging scene, or the like.

The second determination portion 37E performs surveillance of a position of the zoom lens 15B2 on the optical axis OA and derives the focal length based on the surveillance result. For example, the derivation of the focal length is implemented using, by the second determination portion 37E, a focal length derivation table in which the position of the zoom lens 15B2 on the optical axis OA and the focal length are associated with each other, or a focal length derivation calculation expression that takes the position of the zoom lens 15B2 on the optical axis OA as an independent variable and takes the focal length as a dependent variable.

The second determination portion 37E acquires the reference value that is stored in advance from the storage 36. The second determination portion 37E compares the focal length with the reference value and determines whether or not the focal length is greater than or equal to the reference value. In a case where the second determination portion 37E determines that the focal length is greater than or equal to the reference value, the control portion 37B operates the shake correction portion 51.

In a case where the reversal information is acquired by the acquisition portion 37A, the control portion 37B operates the mechanical shake correction portion 29. Specifically, the control portion 37B resolves the misregistration of the captured image accompanied by the reversal of the revolution direction of the surveillance camera 10 by operating the mechanical shake correction portion 29. By operating the mechanical shake correction portion 29, the control portion 37B moves the anti-vibration lens 15B1 in a direction of resolving the misregistration by an amount corresponding to a correction amount required for resolving the misregistration.

The control portion 37B derives an actual correction amount as the correction amount. Specifically, the control portion 37B acquires a reference correction amount and a reference focal length stored in the storage 36. The reference focal length is a focal length as a reference in the surveillance camera 10. In addition, the reference correction amount is a correction amount required for resolving the misregistration by the mechanical shake correction portion 29 in the reference focal length.

In addition, the control portion 37B acquires a sensitivity derivation table 36B stored in the storage 36. The sensitivity derivation table 36B is information indicating a correlation between the focal length of the surveillance camera 10 and sensitivity of the mechanical shake correction portion 29. Here, the sensitivity is a coefficient indicating a relationship between a movement amount of the anti-vibration lens 15B1 of the mechanical shake correction portion 29 and a movement amount of the position of the specific subject (the specific person and/or object or the like) image in the captured image. The sensitivity derivation table 36B is an example of "correlation information" according to the embodiment of the disclosed technology.

The control portion 37B acquires an imaging focal length (for example, a currently used focal length) used in imaging performed by the surveillance camera 10 from the zoom lens 15B2 and the moving mechanism 21. Specifically, the control portion 37B performs surveillance of the position of the zoom lens 15B2 on the optical axis OA and derives the focal length based on the surveillance result. For example, the derivation of the imaging focal length is implemented using, by the control portion 37B, the focal length derivation table in which the position of the zoom lens 15B2 on the optical axis OA and the focal length are associated with each other, or the focal length derivation calculation expression that takes the position of the zoom lens 15B2 on the optical axis OA as an independent variable and takes the focal length as a dependent variable. The control portion 37B derives sensitivity (hereinafter, referred to as "current sensitivity") corresponding to the imaging focal length from the sensitivity derivation table 36B. In addition, the control portion 37B derives sensitivity (hereinafter, referred to as "reference sensitivity") corresponding to the reference focal length from the sensitivity derivation table 36B. Furthermore, the control portion 37B derives the reference correction amount based on Calculation Expression (1) below. The current sensitivity in the calculation expression below is an example of "sensitivity corresponding to an imaging focal length" according to the embodiment of the disclosed technology.

$$H = Hs/(Cs \times C) \qquad (1)$$

In Calculation Expression (1), H denotes the actual correction amount, Hs denotes the reference correction amount, C denotes the current sensitivity, and Cs denotes the reference sensitivity.

The control portion 37B causes the mechanical shake correction portion 29 to resolve the misregistration of the captured image in accordance with the derived actual correction amount. Specifically, the mechanical shake correction portion 29 moves the anti-vibration lens 15B1 in the direction of resolving the misregistration by an amount corresponding to the actual correction amount. Consequently, as illustrated in FIG. 8 as an example, the misregistration accompanied by the reversal of the revolution direction of the surveillance camera 10 is resolved in the captured image displayed on the display 13.

Figure 9A:
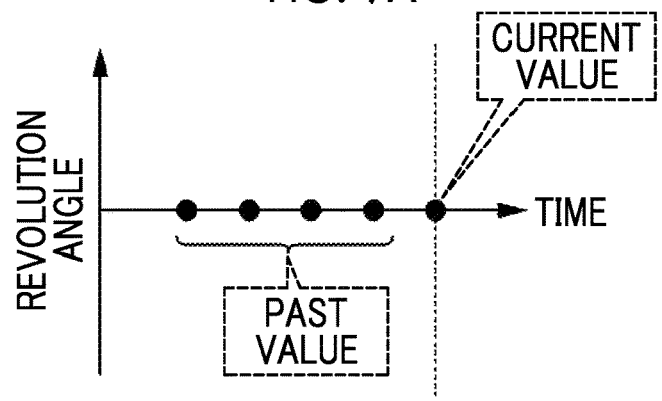
FIG. 9A is a conceptual diagram illustrating an example of detection of reversal of a revolution direction according to the embodiment.
Figure 9B:
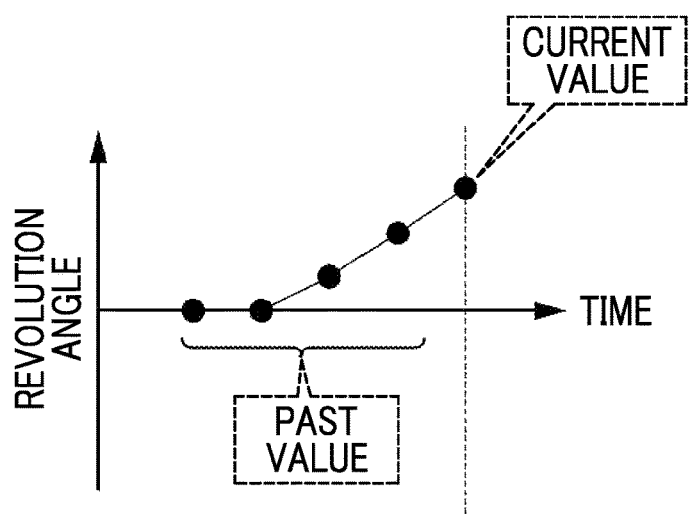
FIG. 9B is a conceptual diagram illustrating an example of the detection of the reversal of the revolution direction according to the embodiment.
Figure 9C:
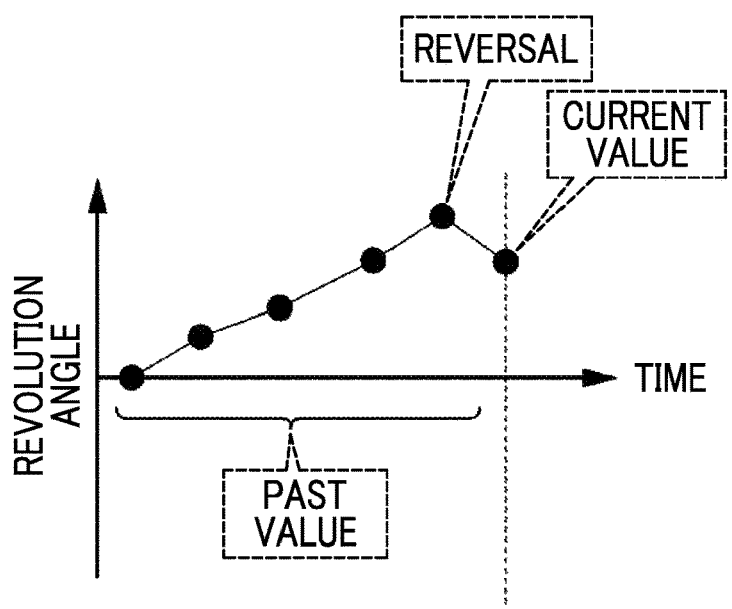
FIG. 9C is a conceptual diagram illustrating an example of the detection of the reversal of the revolution direction according to the embodiment.

Next, the resolving of the misregistration using the mechanical shake correction portion 29 will be described. As illustrated in FIG. 9A as an example, in a state (hereinafter, referred to as the "stoppage state") where the revolution of the surveillance camera 10 is stopped, the surveillance camera 10 does not revolve. Thus, a revolution angle of the surveillance camera 10 is 0 degrees. In a case where the surveillance camera 10 revolves in the same direction by the revolution mechanism 16, as illustrated in FIG. 9B as an example, the sign of the angular difference calculated by the angular difference calculation portion 37C is "positive". In a case where the revolution direction of the surveillance camera 10 is reversed, as illustrated in FIG. 9C as an example, the revolution angle of the surveillance camera 10 is decreased, and the angular difference sign changes to "negative" from "positive". Here, while an example of a form in which the angular difference sign changes to "negative" from "positive" is illustrated, the angular difference sign may change to "positive" from "negative". In such a manner, changing of the angular difference sign from one of "positive" and "negative" to the other means that the revolution direction of the surveillance camera 10 is reversed. Whether or not the angular difference sign is changed is determined by the first determination portion 37D as described above.

Figure 10:
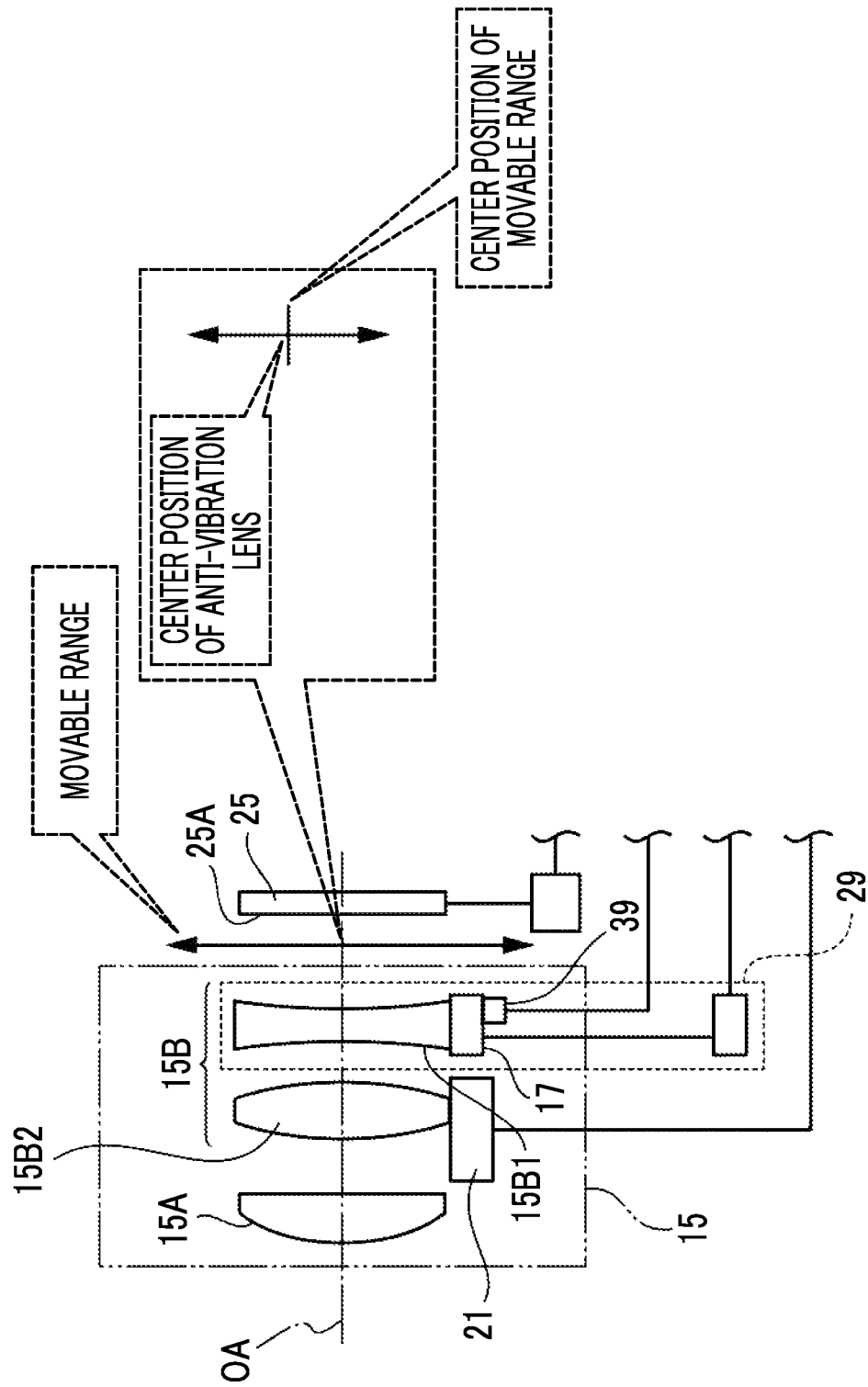
FIG. 10 is a conceptual diagram for describing a reference position of a shake correction portion according to the embodiment.
Figure 11A:
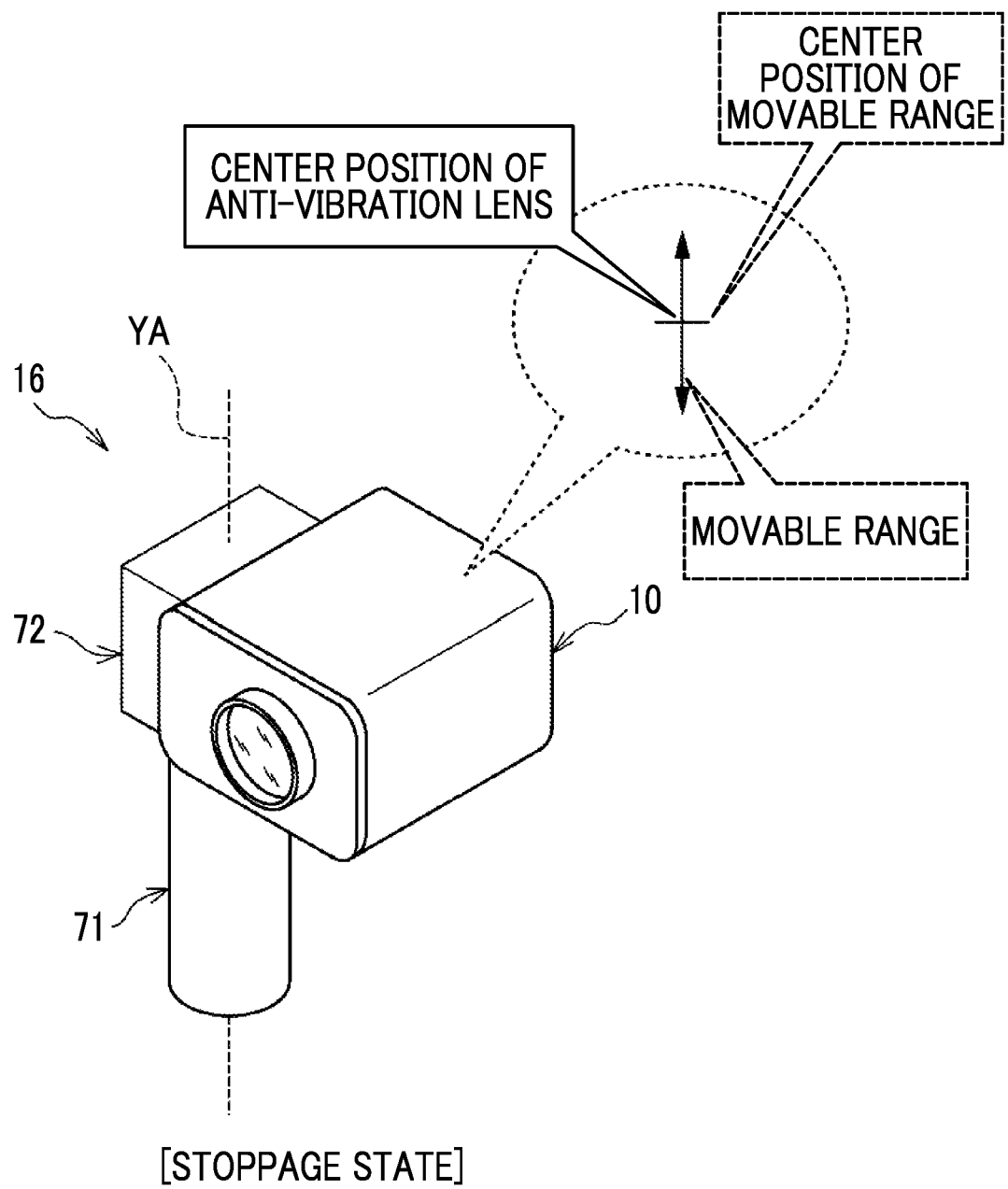
FIG. 11A is a conceptual diagram for describing resolving of the misregistration by the shake correction portion according to the embodiment.
Figure 11B:
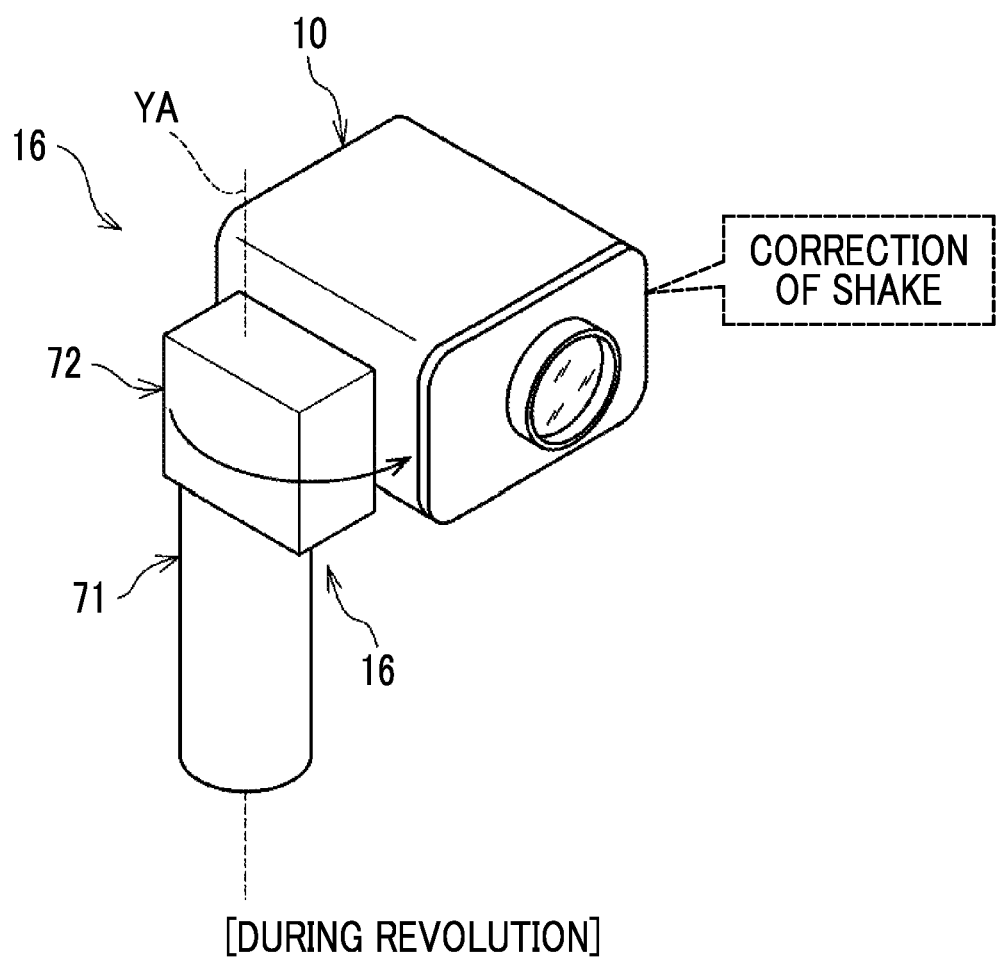
FIG. 11B is a conceptual diagram for describing the resolving of the misregistration by the shake correction portion according to the embodiment.
Figure 11C:
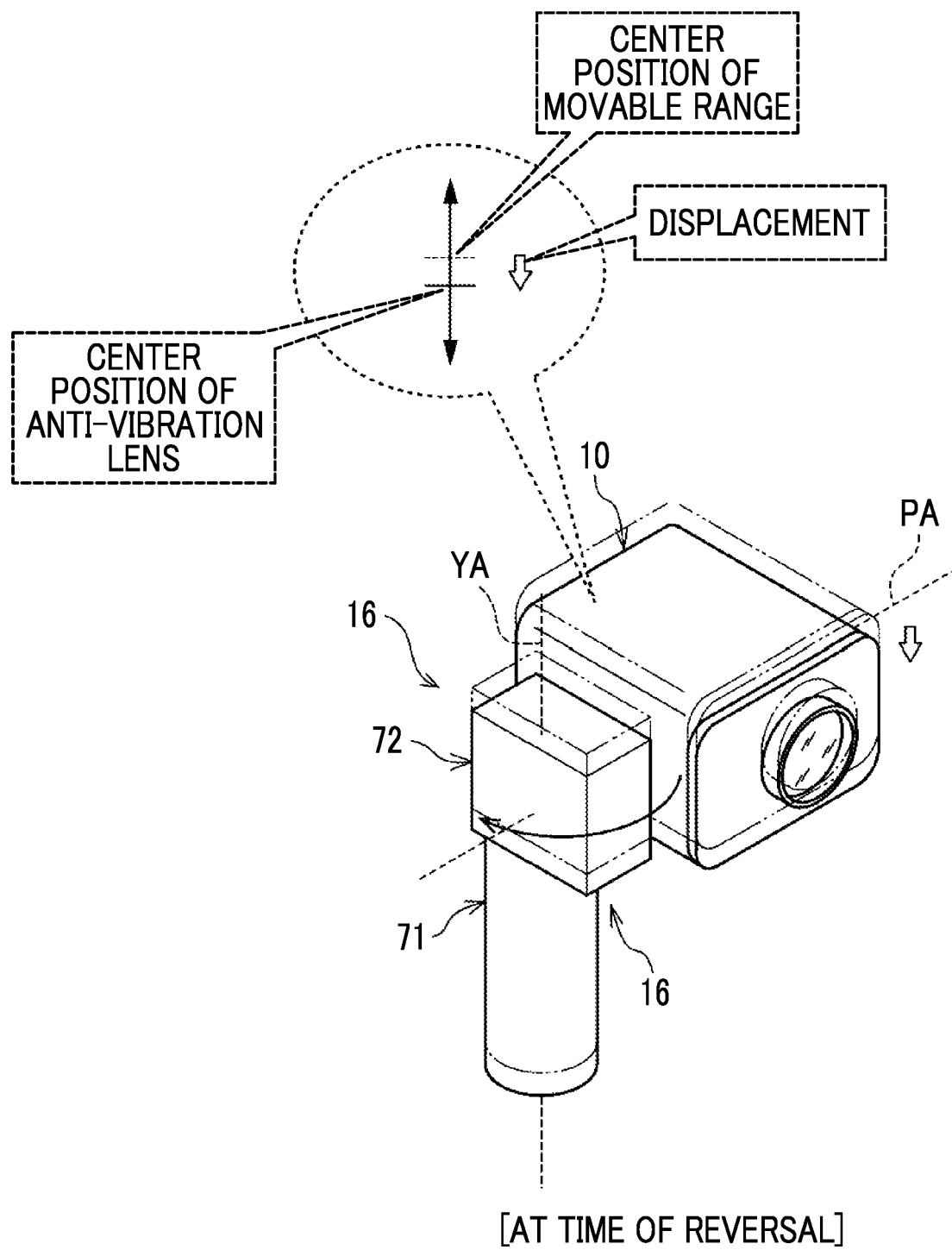
FIG. 11C is a conceptual diagram for describing the resolving of the misregistration by the shake correction portion according to the embodiment.

As illustrated in FIG. 10 as an example, for a reason such as structural constraints on the surveillance camera 10, a movable range of which a center position is a position of the optical axis OA is decided for the anti-vibration lens 15B1 of the mechanical shake correction portion 29 on a plane perpendicular to the optical axis OA. As illustrated in FIG. 11A as an example, in the stoppage state, a center position of the anti-vibration lens 15B1 coincides with the center position within the movable range. As illustrated in FIG. 11B as an example, while the surveillance camera 10 is revolving in the yaw direction by the revolution mechanism 16, the mechanical shake correction portion 29 corrects the shake accompanied by the vibration or the like during the revolution. As illustrated in FIG. 11C as an example, in a case where the revolution direction of the surveillance camera 10 is reversed, the center position of the anti-vibration lens 15B1 is shifted from the center position of the movable range, and the pitch axis PA is displaced in the direction of the yaw axis YA as described above.

Figure 12A:
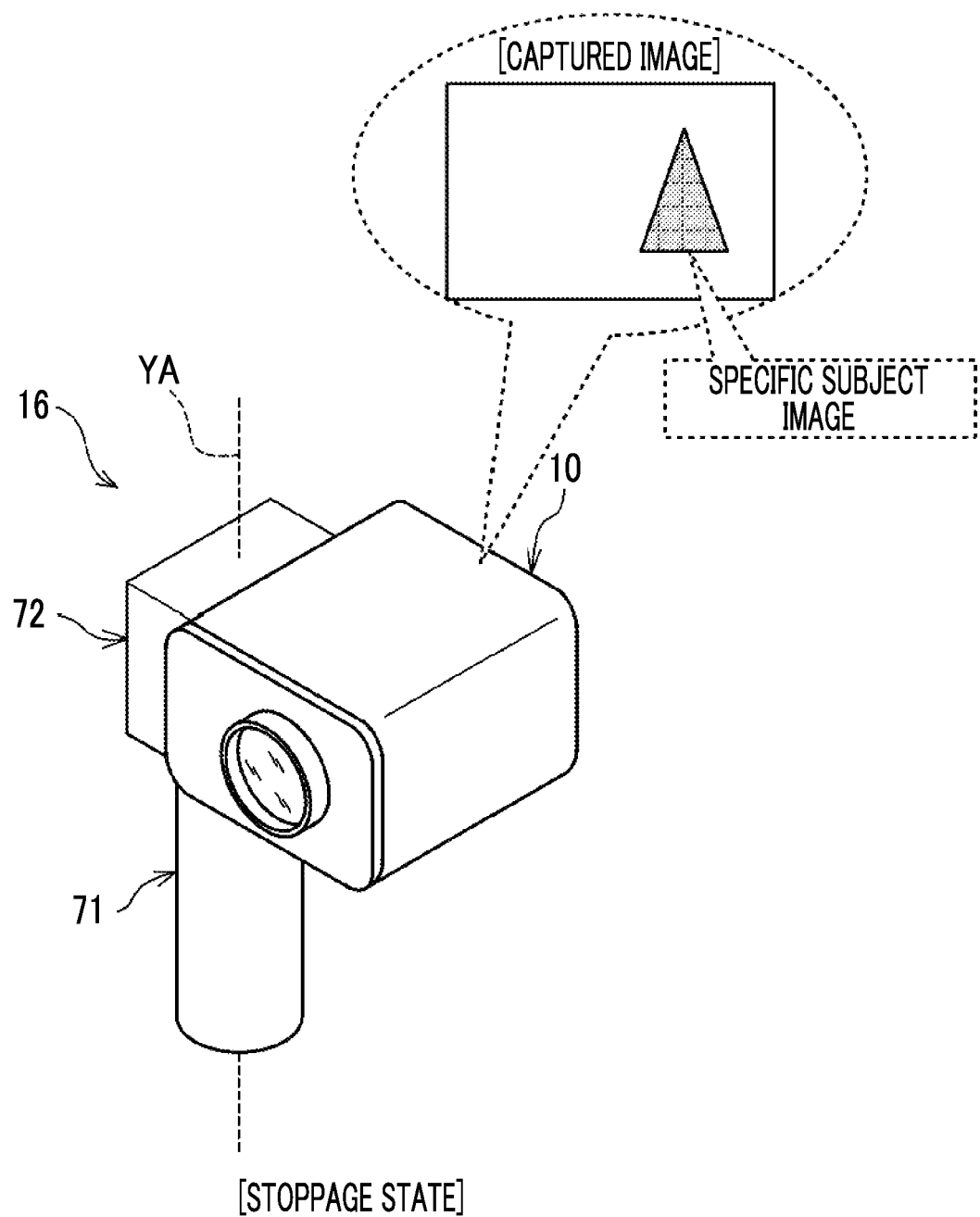
FIG. 12A is a conceptual diagram for describing the resolving of the misregistration by the shake correction portion according to the embodiment.
Figure 12B:
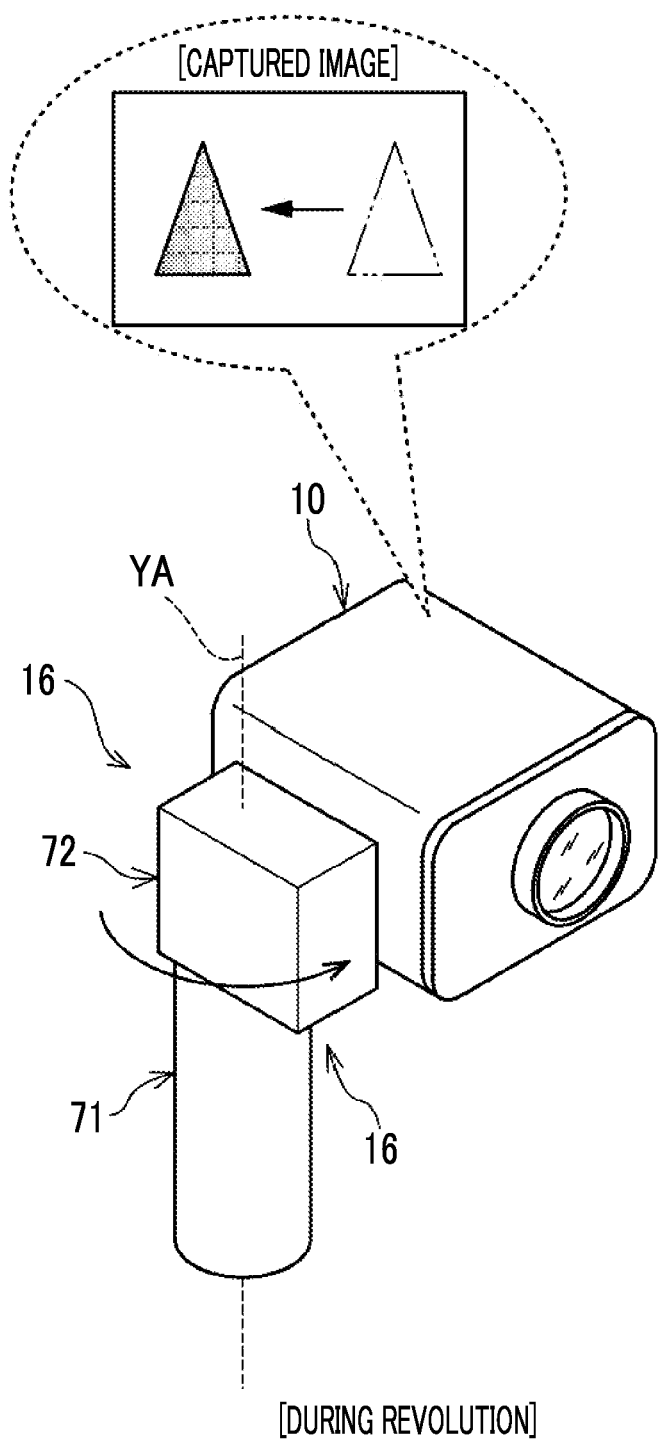
FIG. 12B is a conceptual diagram for describing the resolving of the misregistration by the shake correction portion according to the embodiment.
Figure 12C:
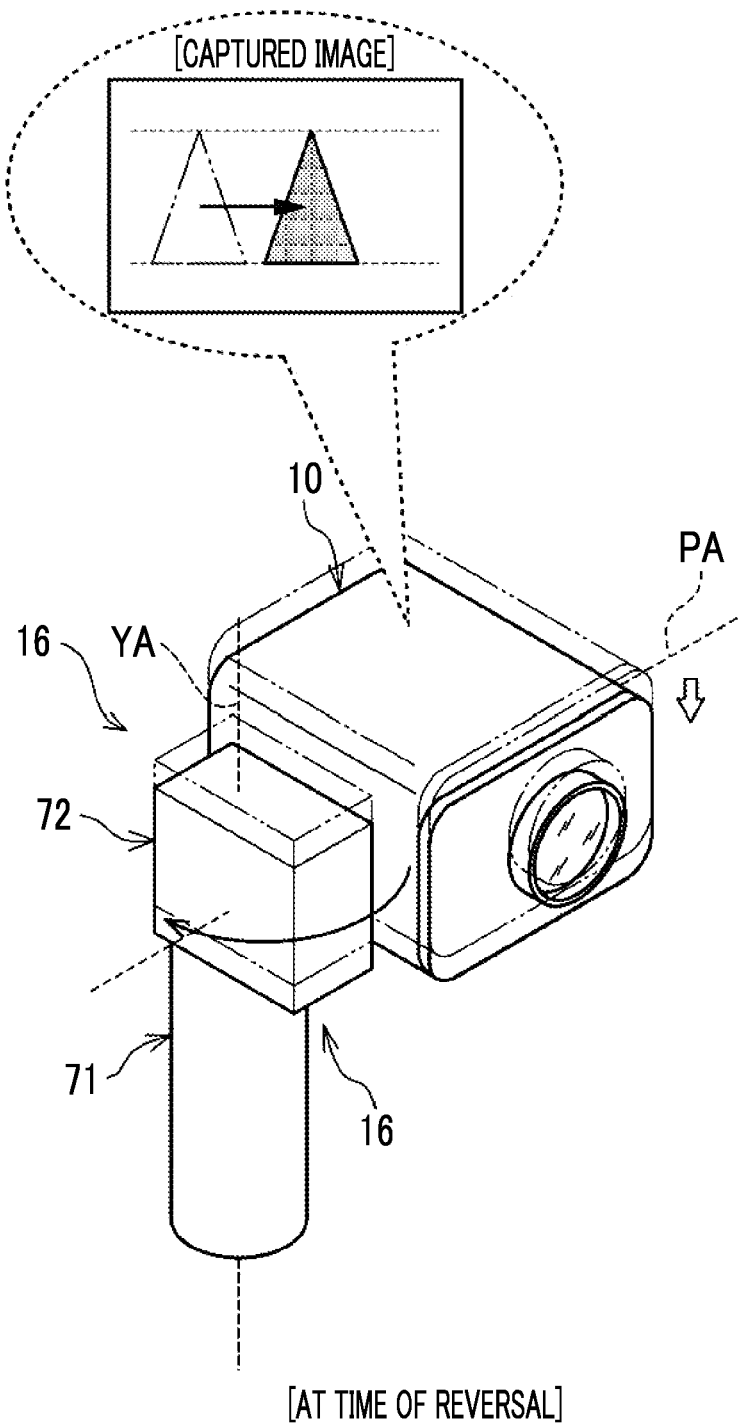
FIG. 12C is a conceptual diagram for describing the resolving of the misregistration by the shake correction portion according to the embodiment.

In a case where the surveillance camera 10 revolves in the yaw direction as illustrated in FIG. 12B from the stoppage state illustrated in FIG. 12A as an example, the position of the specific subject image moves in the captured image. Then, as illustrated in FIG. 12C as an example, the pitch axis PA of the surveillance camera 10 moves along the yaw axis YA in accordance with the reversal of the revolution direction about the yaw axis YA as the central axis. At this point, as described above, the mechanical shake correction portion 29 moves the anti-vibration lens 15B1 in the direction of resolving the misregistration accompanied by the reversal of the revolution direction by an amount corresponding to a shift amount between the center position of the anti-vibration lens 15B1 and the center position of the movable range. Consequently, the misregistration of the captured image in a direction of the pitch axis PA is resolved.

Figure 13:
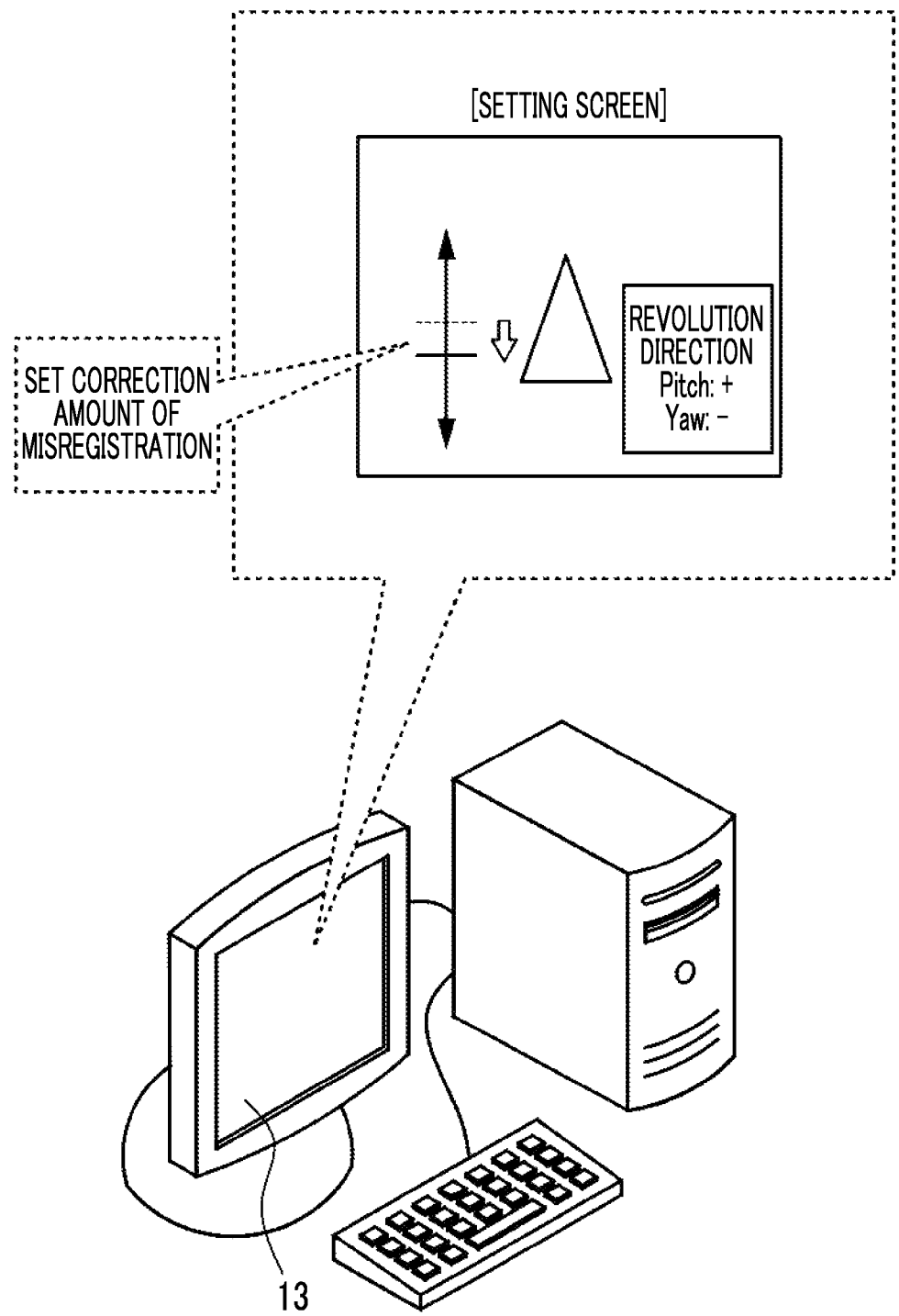
FIG. 13 is a conceptual diagram illustrating a screen display example displayed by a display portion according to the embodiment.

As illustrated in FIG. 13 as an example, the correction amount with which the misregistration accompanied by the reversal of the revolution direction is resolved is displayed on the display 13. Specifically, the control portion 37B displays the movement amount of the anti-vibration lens 15B1 on the display 13 as the correction amount required for resolving the misregistration by the mechanical shake correction portion 29.

In the example illustrated in FIG. 13, while a case of visibly displaying the movement amount display screen is illustrated, audible display such as output of sound by a sound reproducing device (not illustrated), permanent visible display such as output of a printed material by a printer, or tactile display by a vibrator may be performed instead of the visible display or together with the visible display.

Figure 14:
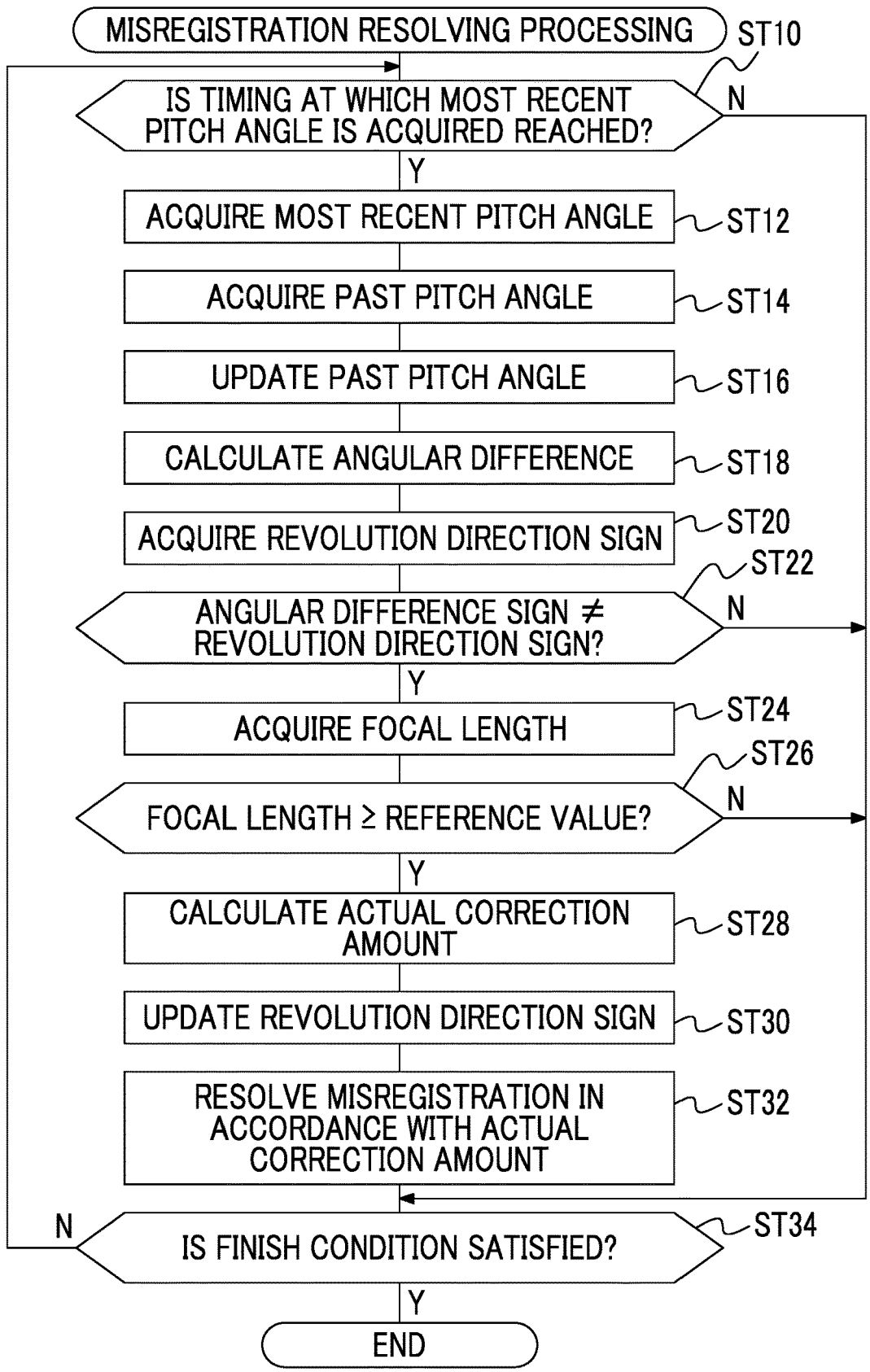
FIG. 14 is a flowchart illustrating an example of a flow of misregistration resolving processing according to the embodiment.

Next, actions of parts of the surveillance system 2 according to the embodiment of the disclosed technology will be described with reference to FIG. 14. FIG. 14 illustrates an example of a flow of misregistration resolving processing executed by the CPU 37. The flow of misregistration resolving processing illustrated in FIG. 14 is an example of an "imaging support method" according to the embodiment of the disclosed technology.

In the misregistration resolving processing illustrated in FIG. 14, first, in step ST10, the control portion 37B determines whether or not a timing at which the most recent pitch angle is acquired is reached. In a case where the timing at which the most recent pitch angle is acquired is not reached, a negative determination is made, and the misregistration resolving processing transitions to step ST34. In step ST10, in a case where the timing at which the most recent pitch angle is acquired is reached, a positive determination is made, and the misregistration resolving processing transitions to step ST12.

In step ST12, the angular difference calculation portion 37C acquires the most recent pitch angle from the gyro sensor 41. Then, the misregistration resolving processing transitions to step ST14.

In step ST14, the angular difference calculation portion 37C acquires the past pitch angle from the memory 35. Then, the misregistration resolving processing transitions to step ST16.

In step ST16, the angular difference calculation portion 37C updates the value of the past pitch angle stored in the memory 35 to the value of the most recent pitch angle acquired from the gyro sensor 41 in step ST12. Then, the misregistration resolving processing transitions to step ST18.

In step ST18, the angular difference calculation portion 37C calculates the angular difference between the most recent pitch angle and the past pitch angle. Then, the misregistration resolving processing transitions to step ST20.

In step ST20, the first determination portion 37D acquires the revolution direction sign stored in the memory 35. Then, the misregistration resolving processing transitions to step ST22.

In step ST22, the first determination portion 37D determines whether or not the sign of the angular difference calculated in step ST18 and the revolution direction sign acquired in step ST20 are different. In step ST22, in a case where the angular difference sign and the revolution direction sign are the same, a negative determination is made, and the misregistration resolving processing transitions to step ST34. In step ST22, in a case where the angular difference sign and the revolution direction sign are different, a positive determination is made, and the misregistration resolving processing transitions to step ST24.

In step ST24, the second determination portion 37E acquires the focal length from the zoom lens 15B2 and the moving mechanism 21. Then, the misregistration resolving processing transitions to step ST26.

In step ST26, the second determination portion 37E determines whether or not the focal length is greater than or equal to the reference value. In step ST26, in a case where the focal length is less than the reference value, a negative determination is made, and the misregistration resolving processing transitions to step ST34. In step ST26, in a case where the focal length is greater than or equal to the reference value, a positive determination is made, and the misregistration resolving processing transitions to step ST28.

In step ST28, the control portion 37B derives the actual correction amount based on the reference correction amount, the reference sensitivity, and the current sensitivity. Then, the misregistration resolving processing transitions to step ST30.

In step ST30, the first determination portion 37D updates the revolution direction sign stored in the memory 35 to the sign of the angular difference calculated in step ST18. Then, the misregistration resolving processing transitions to step ST32.

In step ST32, the control portion 37B causes the shake correction portion 51 to resolve the misregistration in accordance with the actual correction amount derived in step ST28. Then, the misregistration resolving processing transitions to step ST34.

In step ST34, the control portion 37B determines whether or not a condition (hereinafter, referred to as a "misregistration resolving processing finish condition") under which the misregistration resolving processing is finished is satisfied. Examples of the misregistration resolving processing finish condition include a condition that an instruction to finish the misregistration resolving processing is received by the reception device 62. In step ST34, in a case where the misregistration resolving processing finish condition is not satisfied, a negative determination is made, and the misregistration resolving processing transitions to step ST10. In step ST34, in a case where the misregistration resolving processing finish condition is satisfied, a positive determination is made, and the misregistration resolving processing is finished.

In the present embodiment, while an example of a form in which the acquisition portion 37A acquires the reversal information based on a change in sign of the angular difference depending on the detection result of the gyro sensor 41 is illustratively described, the disclosed technology is not limited thereto. For example, in a case where an instruction to reverse the revolution direction of the revolution mechanism 16 is received by the reception device 62, the reversal information may be transmitted to the surveillance camera 10 from the control device 60, and the reversal information may be acquired by the acquisition portion 37A of the surveillance camera 10.

In addition, as another example of a form related to the reversal information, the reversal of the revolution direction may be detected based on a motion picture image including an exterior of the surveillance camera 10. Specifically, an imaging apparatus provided outside (hereinafter, referred to as the "outside imaging apparatus") at a position at which the exterior of the surveillance camera 10 can be imaged images the exterior of the surveillance camera 10. The outside imaging apparatus comprises a CPU and an image memory. The CPU of the outside imaging apparatus acquires the captured image from the image memory of the outside imaging apparatus and performs image recognition of the surveillance camera 10 on the acquired captured image. A storage of the outside imaging apparatus stores an image recognition dictionary. An image of the surveillance camera 10 as an image recognition target is registered in the image recognition dictionary. The CPU of the outside imaging apparatus determines whether or not the surveillance camera 10 is included in the captured image by referring to the image recognition dictionary of the storage. In addition, in a case where the surveillance camera 10 is included in the captured image, the CPU of the outside imaging apparatus determines whether or not the revolution direction of the image of the surveillance camera 10 in the captured image is reversed. In addition, in a case where the reversal of the revolution direction of the surveillance camera 10 is detected, the CPU of the outside imaging apparatus outputs the reversal information. The acquisition portion 37A acquires the reversal information output by the CPU of the outside imaging apparatus.

In addition, in the present embodiment, while an example of a form of resolving the misregistration by moving the anti-vibration lens 15B1 is illustratively described, the disclosed technology is not limited thereto. For example, the misregistration may be resolved by moving the imaging element 25 in a plane parallel to the two-dimensional plane of the anti-vibration lens instead of the anti-vibration lens 15B1. In this case, the misregistration can be resolved within the movable range of the imaging element 25. In addition, the current position of the movable range of the imaging element 25 is acquired by a position detection sensor (not illustrated) of the imaging element 25.

Figure 15:
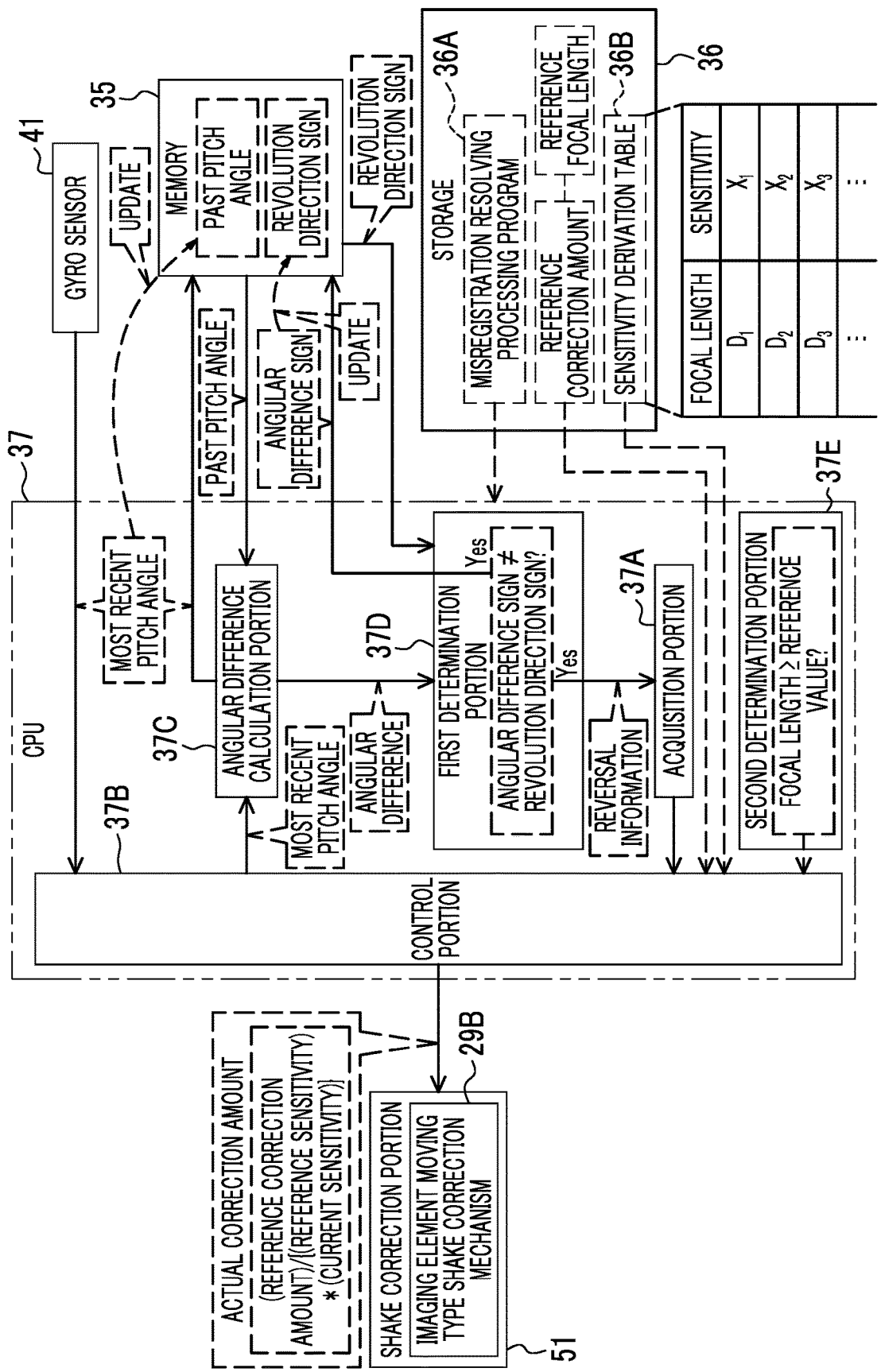
FIG. 15 is a function block diagram illustrating a modification example of the functions of the CPU included in the surveillance camera according to the embodiment.

As illustrated in FIG. 15 as an example, the control portion 37B causes an imaging element moving type shake correction mechanism 29B as the shake correction portion 51 to resolve the misregistration in accordance with the actual correction amount. The imaging element moving type shake correction mechanism 29B corrects the shake by applying motive power generated by a driving source such as a motor (for example, a voice coil motor) to the imaging element to move the imaging element in the direction perpendicular to the optical axis of the imaging optical system. That is, the imaging element moving type shake correction mechanism 29B moves the imaging element 25 in the direction of resolving the misregistration accompanied by the reversal of the revolution direction by an amount corresponding to the actual correction amount. In the example illustrated in FIG. 15, the imaging element moving type shake correction mechanism 29B is an example of the "shake correction component" and the "optical shake correction mechanism" according to the embodiment of the disclosed technology.

In addition, a mechanical shake correction mechanism (not illustrated) that is an example of the "shake correction component" and the "optical shake correction mechanism" according to the embodiment of the disclosed technology may resolve the misregistration by moving both of the anti-vibration lens 15B1 and the imaging element 25 using motive power generated by a driving source such as a motor (for example, a voice coil motor). In this case, the misregistration is resolved within the movable range of each of the anti-vibration lens 15B1 and the imaging element 25.

Figure 16:
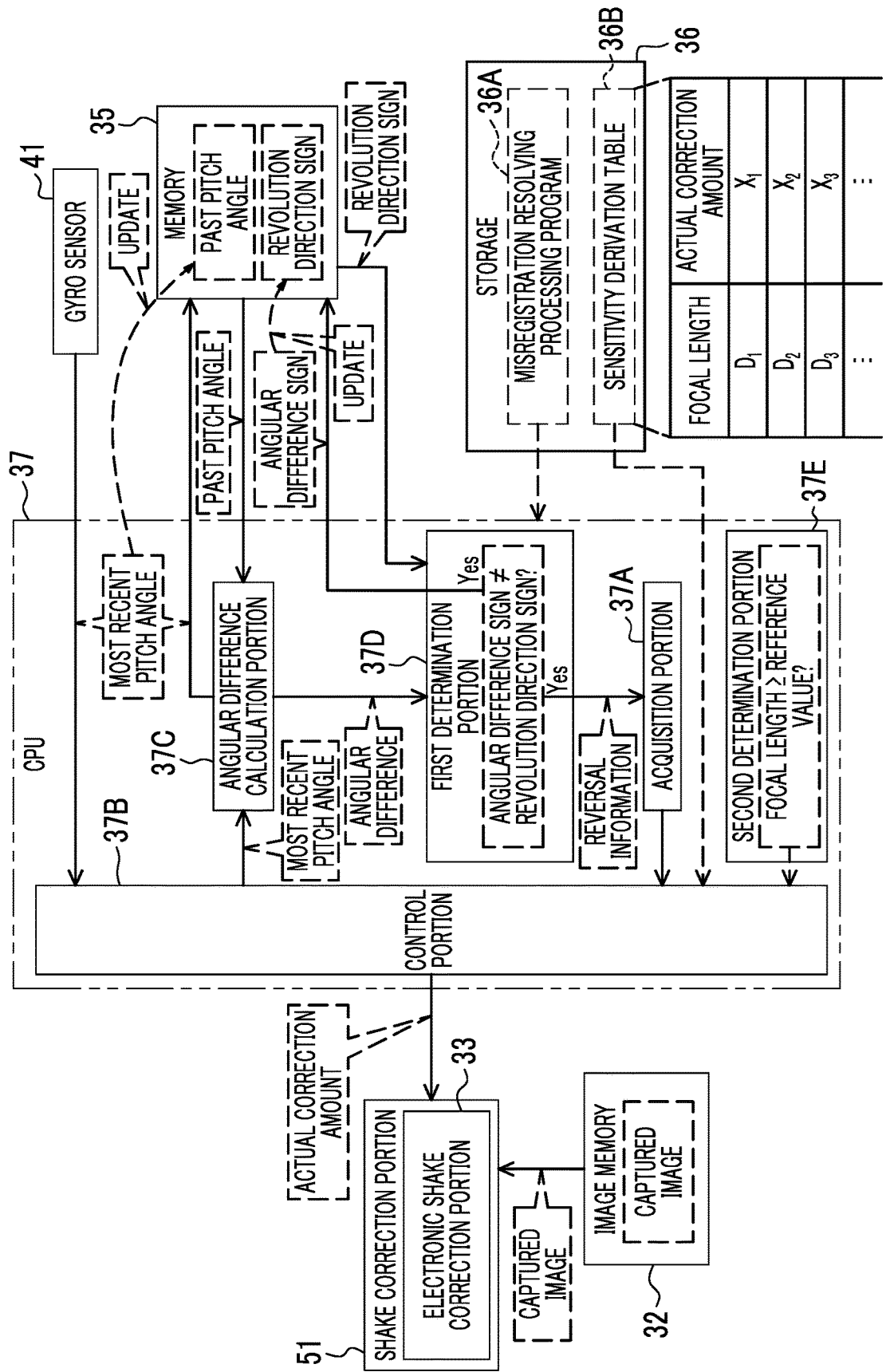
FIG. 16 is a function block diagram illustrating a modification example of the functions of the CPU included in the surveillance camera according to the embodiment.

In addition, in the present embodiment, while an example of a form of resolving the misregistration by the mechanical shake correction portion 29 is illustratively described, the disclosed technology is not limited thereto. For example, the misregistration may be resolved by the electronic shake correction portion 33. As illustrated in FIG. 16 as an example, the control portion 37B causes the electronic shake correction portion 33 to resolve the misregistration in accordance with the actual correction amount. The electronic shake correction portion 33 resolves the misregistration by performing the image processing on the captured image in the image memory 32 based on the actual correction amount.

In addition, in the present embodiment, while an example of a form in which the control portion 37B derives the actual correction amount as the correction amount is illustratively described, the disclosed technology is not limited thereto. For example, the reception device 62 of the management apparatus 11 may receive an instruction related to the correction amount (hereinafter, referred to as a "correction amount instruction"), and the control portion 37B may cause the shake correction portion 51 to resolve the misregistration in accordance with the correction amount decided in accordance with the correction amount instruction received by the reception device 62. The reception device 62 is an example of a "reception portion (reception device)" according to the embodiment of the disclosed technology.

In addition, in the present embodiment, while an example of a form of storing the misregistration resolving processing program 36A in the storage 36 is illustratively described, the disclosed technology is not limited thereto. For example, the storage 60B of the management apparatus 11 may store the misregistration resolving processing program 36A, and the CPU 60A may execute the misregistration resolving processing in accordance with the misregistration resolving processing program 36A stored in the storage 60B. In this case, the CPU 60A operates as an acquisition portion corresponding to the acquisition portion 37A, a control portion corresponding to the control portion 37B, an angular difference calculation portion corresponding to the angular difference calculation portion 37C, a first determination portion corresponding to the first determination portion 37D, and a second determination portion corresponding to the second determination portion 37E by reading out the misregistration resolving processing program 36A from the storage 60B and executing the read misregistration resolving processing program 36A on the memory 60C.

In addition, in the present embodiment, while an example of a form of executing the misregistration resolving processing by any one of the CPU 37 of the surveillance camera 10 and the CPU 60A of the management apparatus 11 is illustratively described, the disclosed technology is not limited thereto. For example, the misregistration resolving processing may be executed in a distributed manner between the CPU 60A of the management apparatus 11 and the CPU 37 of the surveillance camera 10.

In addition, in the present embodiment, while an example of a form in which a part of the surveillance camera 10 and the revolution mechanism 16 moves along the central axis of the revolution direction in accordance with the reversal of the revolution direction of the surveillance camera 10 is illustratively described, the disclosed technology is not limited thereto. For example, an axis intersecting with the central axis of the revolution direction may move along the central axis of the revolution direction by tilting the surveillance camera 10 about the axis intersecting with the central axis of the revolution direction in accordance with the reversal of the revolution direction.

Figure 17:
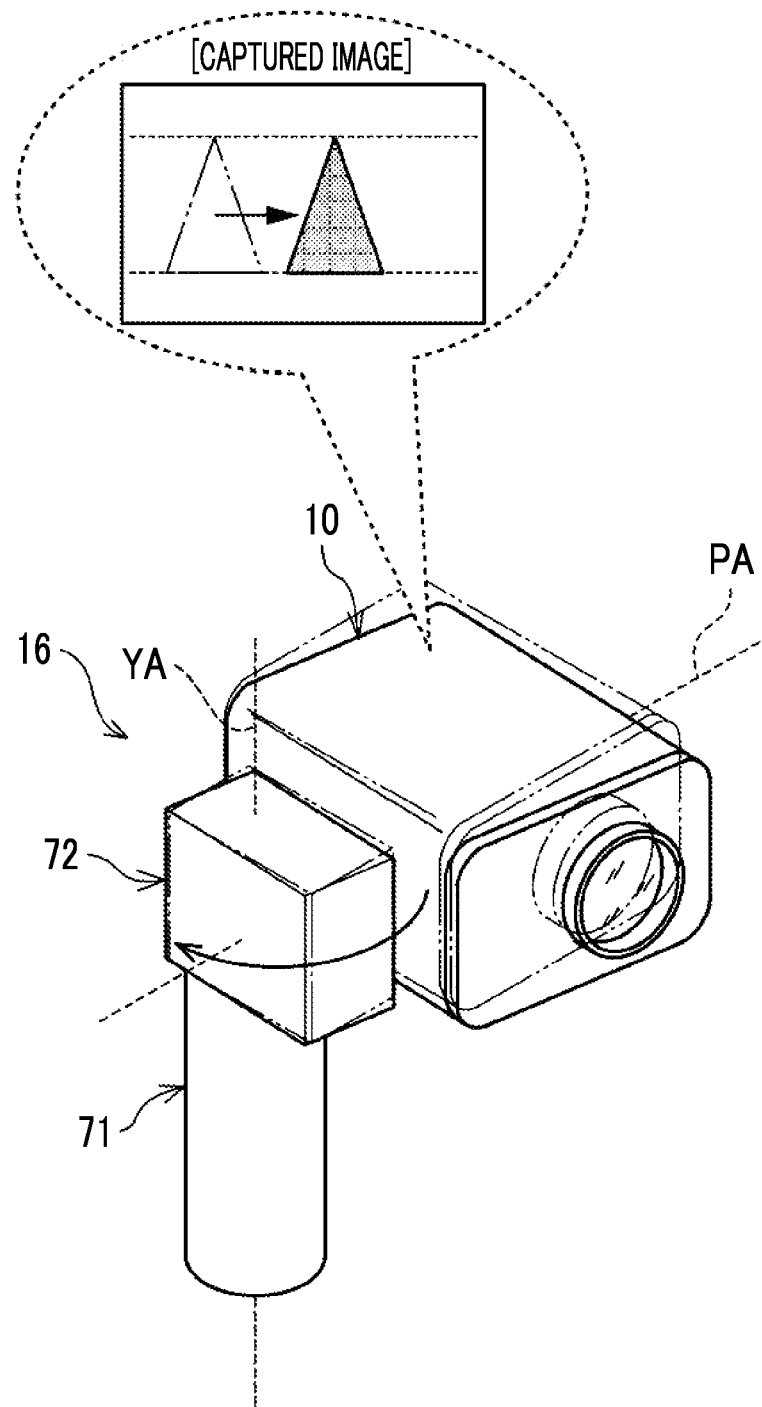
FIG. 17 is a conceptual diagram for describing the resolving of the misregistration by the shake correction portion according to the embodiment.

Specifically, as illustrated in FIG. 17 as an example, the surveillance camera 10 tilts about the pitch axis PA as the central axis in accordance with the reversal of the revolution direction about the yaw axis YA as the central axis. Consequently, the misregistration of the captured image in the direction of the pitch axis PA occurs.

Therefore, in the surveillance camera 10, in a case where the reversal information indicating that the revolution direction of the surveillance camera 10 is reversed is acquired, a control of operating the adjustment portion that can adjust the position of the captured image is performed. Accordingly, the misregistration of the captured image in a case where the revolution direction of the surveillance camera 10 by the revolution mechanism 16 is reversed as illustrated in FIG. 17 as an example can be resolved.

As described above, in the surveillance camera 10, in a case where the revolution direction of the surveillance camera 10 is reversed by the revolution mechanism 16, the misregistration of the captured image occurs in a direction along the central axis of the revolution direction. Therefore, in the surveillance camera 10, in a case where the reversal information indicating that the revolution direction of the surveillance camera 10 is reversed is acquired, a control of operating the shake correction portion 51 that can adjust the position of the captured image is performed. Accordingly, the misregistration of the captured image in a case where the revolution direction of the surveillance camera 10 by the revolution mechanism 16 is reversed can be resolved.

In addition, in the surveillance camera 10, as an example, the pitch axis PA moves along the yaw axis YA in accordance with the reversal of the revolution direction about the yaw axis YA as the central axis in the revolution mechanism 16. Accordingly, the revolution mechanism 16 causes the misregistration of the captured image obtained by imaging performed by the surveillance camera 10. Accordingly, as an example of the misregistration of the captured image in a case where the revolution direction of the surveillance camera 10 by the revolution mechanism 16 is reversed, the misregistration that occurs due to the movement of the pitch axis PA along the yaw axis YA can be resolved.

In the surveillance camera 10, the revolution mechanism 16 includes the yaw axis revolution mechanism 71 that enables the surveillance camera 10 to revolve about the yaw axis YA as the central axis, and the pitch axis revolution mechanism 72 that enables the surveillance camera 10 to revolve about the pitch axis PA as the central axis. In addition, as an example, the misregistration occurs due to the mechanical displacement of the pitch axis revolution mechanism 72 in a direction of the central axis of the reversal accompanied by the reversal of the surveillance camera 10 by the yaw axis revolution mechanism 71. Accordingly, as an example of the misregistration of the captured image in a case where the revolution direction of the surveillance camera 10 by the revolution mechanism 16 is reversed, the misregistration that occurs due to the mechanical displacement of the pitch axis revolution mechanism 72 in accordance with the reversal of the surveillance camera 10 by the yaw axis revolution mechanism 71 can be resolved.

In the surveillance camera 10, as an example, the displacement is the mechanical displacement that occurs due to the backlash of the yaw axis revolution mechanism 71 accompanied by the reversal. Accordingly, as the misregistration of the captured image in a case where the revolution direction of the surveillance camera 10 by the revolution mechanism 16 is reversed, the misregistration due to the backlash can be resolved.

In the surveillance camera 10, the control portion 37B resolves the misregistration by operating the shake correction portion 51 that corrects the shake occurring due to the vibration exerted on the surveillance camera 10. Accordingly, the misregistration of the captured image in a case where the revolution direction of the surveillance camera 10 by the revolution mechanism 16 is reversed can be resolved with high accuracy compared to a case where the position of the captured image is adjusted using only the revolution mechanism 16.

In the surveillance camera 10, the control portion 37B causes the shake correction portion 51 to resolve the misregistration in accordance with the correction amount decided in accordance with the instruction received by the reception device 42A and/or the reception device 62. Accordingly, the user or the like can adjust, to any amount, the correction amount that is used by the shake correction portion 51 in the resolving, using the shake correction portion 51, of the misregistration of the captured image in a case where the revolution direction of the surveillance camera 10 by the revolution mechanism 16 is reversed.

In the surveillance camera 10, the control portion 37B displays the correction amount required for resolving the misregistration by the shake correction portion 51 on the display 13 and/or the display 43B. Accordingly, the user or the like can recognize the correction amount that is used by the shake correction portion 51 in the resolving, using the shake correction portion 51, of the misregistration of the captured image in a case where the revolution direction of the surveillance camera 10 by the revolution mechanism 16 is reversed.

In the surveillance camera 10, the control portion 37B controls the shake correction portion 51 in accordance with the focal length of the surveillance camera 10. Accordingly, the misregistration of the captured image can be resolved with high accuracy compared to a case where a control of resolving the misregistration of the captured image in a case where the revolution direction of the surveillance camera 10 by the revolution mechanism 16 is reversed is performed on the shake correction portion 51 without considering the focal length of the surveillance camera 10.

In the surveillance camera 10, the control portion 37B resolves the misregistration by operating the shake correction portion 51 in a case where the focal length of the surveillance camera 10 is greater than or equal to the reference value. Accordingly, the misregistration can be resolved under a situation in which the misregistration of the captured image is likely to be visibly recognized, compared to a case where the control of resolving the misregistration of the captured image in a case where the revolution direction of the surveillance camera 10 by the revolution mechanism 16 is reversed is performed on the shake correction portion 51 in a case where the focal length of the surveillance camera 10 is less than the reference value.

In the surveillance camera 10, the control portion 37B derives the actual correction amount that is required for resolving the misregistration by the shake correction portion 51 and corresponds to the imaging focal length used in imaging performed by the surveillance camera 10, based on the reference correction amount required for resolving the misregistration by the shake correction portion 51 in the reference focal length decided as the focal length as the reference of the surveillance camera 10 and the sensitivity derivation table 36B indicating a correlation between the focal length of the surveillance camera 10 and the sensitivity of the shake correction portion 51. Accordingly, an effort of the user or the like for deciding the correction amount can be reduced compared to a case where the user or the like decides the correction amount corresponding to the focal length of the surveillance camera 10 each time the control of resolving the misregistration of the captured image in a case where the revolution direction of the surveillance camera 10 by the revolution mechanism 16 is reversed is performed by the shake correction portion 51.

In the surveillance camera 10, the control portion 37B causes the shake correction portion 51 to resolve the misregistration in accordance with the actual correction amount. Accordingly, the effort of the user or the like required from the decision of the correction amount to the resolving of the misregistration of the captured image can be reduced compared to a case where the user or the like decides the correction amount corresponding to the focal length of the surveillance camera 10 each time the misregistration of the captured image in a case where the revolution direction of the surveillance camera 10 by the revolution mechanism 16 is reversed is resolved, and then, the shake correction portion 51 resolves the misregistration of the captured image in accordance with the decided correction amount.

In the surveillance camera 10, the actual correction amount is a value obtained by dividing the reference correction amount by a product of the sensitivity corresponding to the reference focal length and the sensitivity corresponding to the imaging focal length. Accordingly, the misregistration of the captured image can be resolved with high accuracy compared to a case where the control of resolving the misregistration of the captured image in a case where the revolution direction of the surveillance camera 10 by the revolution mechanism 16 is reversed is performed by the shake correction portion 51 without considering the sensitivity of the shake correction portion 51.

In the surveillance camera 10, at least one of the mechanical shake correction mechanism 29 or the electronic shake correction portion 33 is employed as the shake correction portion 51. Accordingly, the misregistration of the captured image in a case where the revolution direction of the surveillance camera 10 by the revolution mechanism 16 is reversed can be resolved with high accuracy compared to a case where the position of the captured image in a case where the revolution direction of the surveillance camera 10 by the revolution mechanism 16 is reversed is adjusted using only the revolution mechanism 16.

In the surveillance camera 10, at least one of a lens moving type shake correction mechanism 29A or the imaging element moving type shake correction mechanism 29B is employed as the mechanical shake correction mechanism 29. Accordingly, the misregistration of the captured image in a case where the revolution direction of the surveillance camera 10 by the revolution mechanism 16 is reversed can be resolved with high accuracy compared to a case where the position of the captured image in a case where the revolution direction of the surveillance camera 10 by the revolution mechanism 16 is reversed is adjusted using only the revolution mechanism 16.

Second Embodiment

In the first embodiment, a case where the correction amount required for resolving the misregistration is displayed on the display 13 of the management apparatus 11 is described. In a second embodiment, a case where the correction amount is displayed on the display portion of the surveillance camera 10, and a case where the surveillance camera 10 includes the reception portion that receives the instruction for the correction amount will be described. In the second embodiment, the same constituents as in the first embodiment will be designated by the same reference numerals and will not be described. Hereinafter, parts different from the first embodiment will be described.

Figure 18:
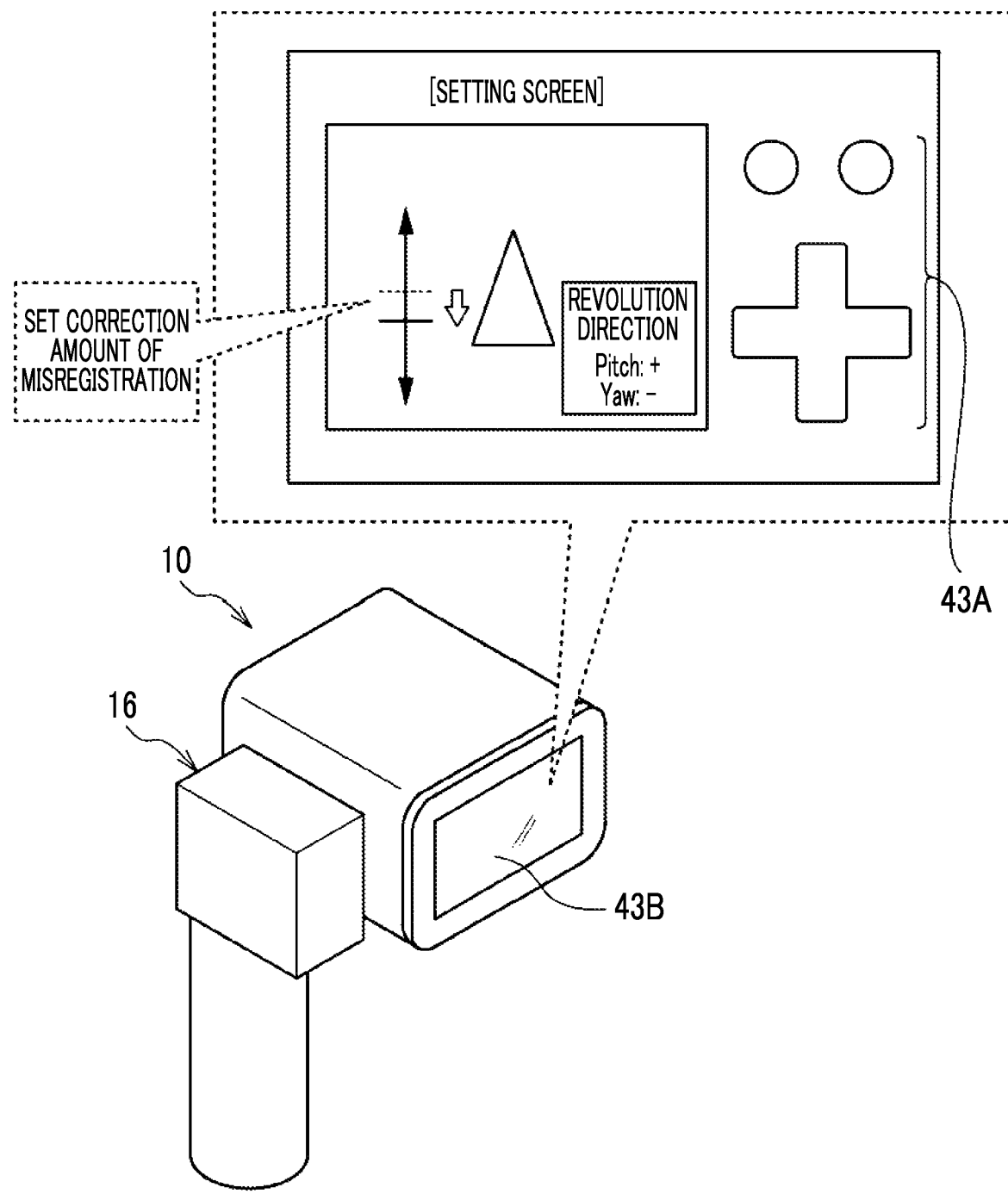
FIG. 18 is a conceptual diagram illustrating a screen display example displayed by the display portion according to the embodiment.

In imaging in the surveillance camera 10 according to the second embodiment, as illustrated in FIG. 18 as an example, the correction amount is displayed on the display 43B provided in the surveillance camera 10. The display 43B is an example of the "display portion (display)" according to the embodiment of the disclosed technology. In addition, as illustrated in FIG. 18 as an example, the reception device 43A of the surveillance camera 10 receives the instruction related to the correction amount required for resolving the misregistration. As an example, an operator or the like of the surveillance camera 10 operates the reception device 43A with reference to setting screen display displayed on the display 43B. The reception device 43A is an example of the "reception portion (reception device)" according to the embodiment of the disclosed technology.

Figure 19:
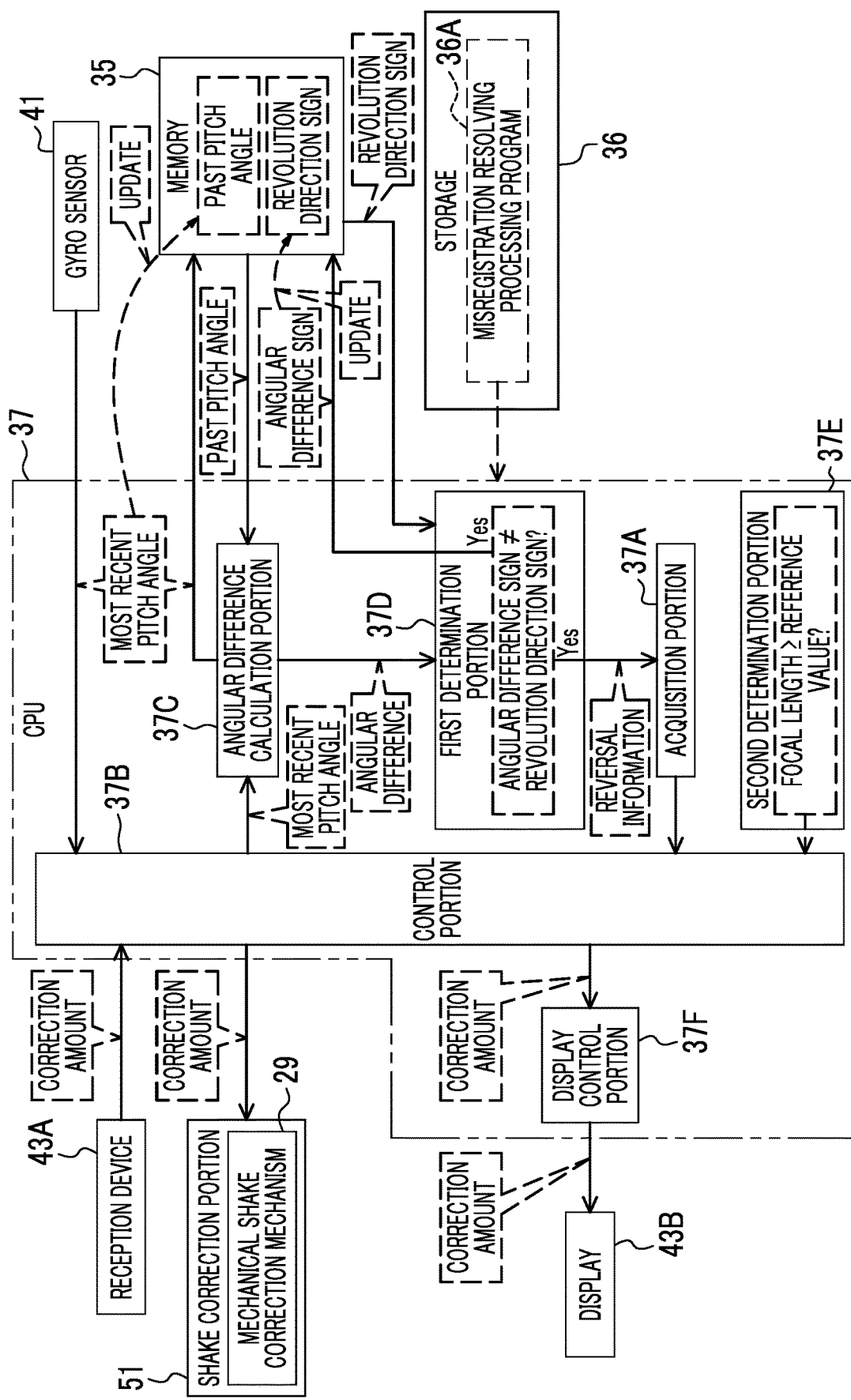
FIG. 19 is a function block diagram illustrating a modification example of the functions of the CPU included in the surveillance camera according to the embodiment.

Specifically, as illustrated in FIG. 19 as an example, the control portion 37B acquires a signal of the instruction related to the correction amount output from the reception device 43A. The control portion 37B decides the correction amount in accordance with the signal. In a case where the acquisition portion 37A acquires the reversal information, the control portion 37B outputs the correction amount decided in accordance with the instruction acquired from the reception device 43A to a display control portion 37F. The display control portion 37F displays the correction amount on the display 43B.

As described above, according to the surveillance camera 10, the operator or the like of the surveillance camera 10 can perceive the correction amount required for resolving the misregistration compared to a case where the display 43B that displays the correction amount is not provided in the surveillance camera 10.

In addition, the operator or the like of the surveillance camera 10 can adjust the correction amount required for resolving the misregistration compared to a case where the reception device 43A is not included in the surveillance camera 10.

In the embodiments, while an example of a form in which the reception device 43A receives the correction amount is illustrated, the disclosed technology is not limited thereto. For example, the reception device 43A may receive instructions related to the revolution direction of the surveillance camera 10. The acquisition portion 37A may acquire the reversal information based on an instruction to reverse the revolution direction of the revolution mechanism 16 among the instructions related to the revolution direction of the surveillance camera 10 received by the reception device 43A. Specifically, the reception device 43A receives an operation of reversing the revolution direction. A signal of the operation of reversing the revolution direction output from the reception device 62 is acquired by the acquisition portion 37A as the reversal information.

In the example illustrated in FIG. 18, while a case of visibly displaying the movement amount display screen is illustrated, audible display such as output of sound by a sound reproducing device (not illustrated), permanent visible display such as output of a printed material by a printer, or tactile display by a vibrator may be performed instead of the visible display or together with the visible display.

In addition, in the embodiments, while a device including an ASIC and an FPGA is illustrated, the disclosed technology is not limited thereto. Various processing may be implemented by a software configuration using a computer.

Figure 20:
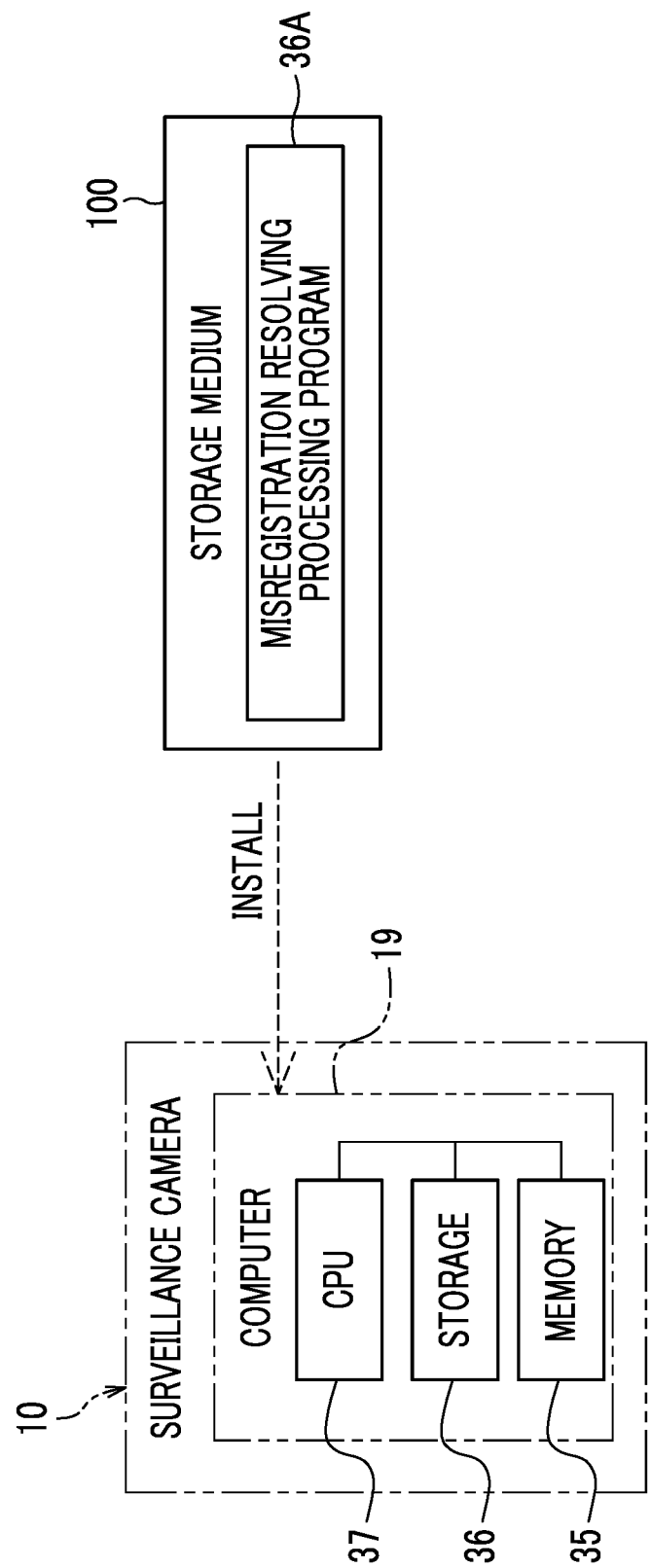
FIG. 20 is a conceptual diagram illustrating an example of an aspect in which a misregistration resolving processing program is installed on a computer in the surveillance camera from a storage medium storing the misregistration resolving processing program according to the embodiment.

In this case, for example, as illustrated in FIG. 20, the computer 19 is incorporated in the surveillance camera 10. The misregistration resolving processing program 36A causing the computer 19 to execute the misregistration resolving processing according to the embodiments is stored in a storage medium 100 that is a non-transitory storage medium. Examples of the storage medium 100 include any portable storage medium such as an SSD or a USB memory.

The computer 19 comprises the CPU 37, the storage 36, and the memory 35. The storage 36 is a non-volatile storage device such as an EEPROM, and the memory 35 is a volatile storage device such as a RAM. The misregistration resolving processing program 36A stored in the storage medium 100 is installed on the computer 19. The CPU 37 executes the misregistration resolving processing in accordance with the misregistration resolving processing program 36A.

The misregistration resolving processing program 36A may be stored in the storage 36 instead of the storage medium 100. In this case, the CPU 37 reads out the misregistration resolving processing program 36A from the storage 36 and executes the read misregistration resolving processing program 36A on the memory 35. In such a manner, the misregistration resolving processing is implemented by executing the misregistration resolving processing program 36A by the CPU 37.

In addition, the misregistration resolving processing program 36A may be stored in a storage portion of another computer, a server apparatus, or the like connected to the computer 19 through a communication network (not illustrated), and the misregistration resolving processing program 36A may be downloaded and installed on the computer 19 in response to a request of the surveillance camera 10.

In the storage portion of the other computer, the server apparatus, or the like connected to the computer 19 or in the storage 36, the entire misregistration resolving processing program 36A does not need to be stored, and a part of the misregistration resolving processing program 36A may be stored.

In the example illustrated in FIG. 20, while an example of an aspect of incorporating the computer 19 in the surveillance camera 10 is illustrated, the disclosed technology is not limited thereto. For example, the computer 19 may be provided outside the surveillance camera 10.

In the example illustrated in FIG. 20, while the CPU 37 is a single CPU, the CPU 37 may include a plurality of CPUs. In addition, a GPU may be applied instead of the CPU 37.

In the example illustrated in FIG. 20, while the computer 19 is illustrated, the disclosed technology is not limited thereto. A device including an ASIC, an FPGA, and/or a PLD may be applied instead of the computer 19. In addition, a combination of a hardware configuration and a software configuration may be used instead of the computer 19.

Various processors illustrated below can be used as a hardware resource for executing the misregistration resolving processing described in each of the embodiments. Examples of the processors include a CPU that is a general-purpose processor functioning as the hardware resource for executing the misregistration resolving processing by executing software, that is, the program. In addition, examples of the processors include a dedicated electric circuit such as an FPGA, a PLD, or an ASIC that is a processor having a circuit configuration dedicatedly designed to execute specific processing. Any of the processors incorporates or is connected to a memory, and any of the processors executes the misregistration resolving processing using the memory.

The hardware resource for executing the misregistration resolving processing may be configured with one of those various processors or may be configured with a combination of two or more processors of the same type or different types (for example, a combination of a plurality of FPGAs or a combination of a CPU and an FPGA). In addition, the hardware resource for executing the misregistration resolving processing may be one processor.

Examples of a configuration with one processor include, first, a form in which one processor is configured with a combination of one or more CPUs and software, and the processor functions as the hardware resource for executing the misregistration resolving processing. Second, as represented by an SoC or the like, a form of using a processor that implements, by one IC chip, functions of the entire system including a plurality of hardware resources for executing the misregistration resolving processing is included. In such a manner, the misregistration resolving processing is implemented using one or more of the various processors as the hardware resource.

Furthermore, more specifically, an electric circuit in which circuit elements such as semiconductor elements are combined can be used as a hardware structure of those various processors. In addition, the misregistration resolving processing is merely an example. Accordingly, unnecessary steps may be deleted, new steps may be added, or a processing order may be rearranged without departing from the gist of the disclosed technology.

In addition, while the surveillance camera 10 is illustrated in the example illustrated in FIG. 1, the disclosed technology is not limited thereto. That is, the disclosed technology can be applied to various electronic apparatuses (for example, a lens-interchangeable camera, a fixed lens camera, a smart device, a personal computer, and/or a wearable terminal apparatus or the like) incorporating the imaging apparatus. Even with these electronic apparatuses, the same actions and effects as the surveillance camera 10 are obtained.

In addition, while the display 43B is illustrated in the embodiments, the disclosed technology is not limited thereto. For example, a separate display that is connected to the imaging apparatus may be used as the "display portion" according to the embodiment of the disclosed technology.

Above described contents and illustrated contents are detailed description for parts according to the embodiment of the disclosed technology and are merely an example of the disclosed technology. For example, description related to the above configurations, functions, actions, and effects is description related to an example of configurations, functions, actions, and effects of the parts according to the embodiment of the disclosed technology. Thus, unnecessary parts may be removed, new elements may be added, or parts may be replaced in the above described contents and the illustrated contents without departing from the gist of the disclosed technology. In addition, particularly, description related to common technical knowledge or the like that does not need to be described in terms of embodying the disclosed technology is omitted in the above described contents and the illustrated contents in order to avoid complication and facilitate understanding of the parts according to the embodiment of the disclosed technology.

In the present specification, "A and/or B" has the same meaning as "at least one of A or B". This means that "A and/or B" may be only A, only B, or a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, technical standards are specifically and individually indicated to be incorporated by reference.

The following appendix is further disclosed with respect to the embodiments.

APPENDIX

An information processing apparatus including a processor, and a memory that is incorporated in or connected to the processor, in which the processor is configured to acquire reversal information indicating that a revolution direction of an imaging apparatus that is caused to revolve about one axis out of a first axis and a second axis intersecting with the first axis as a central axis by a revolution mechanism enabling the imaging apparatus to revolve about each of the first axis and the second axis as the central axis is reversed, and in a case where the reversal information is acquired, perform a control of operating an adjustment portion capable of adjusting a position of a captured image obtained by imaging performed by the imaging apparatus.

What is claimed is:

1. An imaging support device comprising:
a processor; and
a memory that is incorporated in or connected to the processor,
wherein the processor is configured to
acquire reversal information indicating that a revolution direction of an imaging apparatus that is caused to revolve about one axis out of a first axis and a second axis intersecting with the first axis as a central axis by a revolution mechanism enabling the imaging apparatus to revolve about each of the first axis and the second axis as the central axis is reversed, and
in a case where the reversal information is acquired, perform control for operating an adjustment component capable of adjusting a position of a captured image obtained by imaging performed by the imaging apparatus.

2. The imaging support device according to claim 1,
wherein the revolution mechanism causes misregistration of the captured image due to movement, in accordance with the reversal of the revolution direction about the one axis as the central axis, of the other axis along the one axis.

3. The imaging support device according to claim 2,
wherein the revolution mechanism includes a first revolution mechanism that enables the imaging apparatus to revolve about the first axis as the central axis, and a second revolution mechanism that enables the imaging apparatus to revolve about the second axis as the central axis, and
the misregistration is misregistration that occurs due to mechanical displacement, accompanied by reversal of the imaging apparatus by one revolution mechanism out of the first revolution mechanism and the second revolution mechanism, of the other revolution mechanism in a direction of the central axis of the reversal.

4. The imaging support device according to claim 3,
wherein the displacement is mechanical displacement that occurs due to a backlash of the one revolution mechanism accompanied by the reversal.

5. The imaging support device according to claim 2,
wherein the adjustment component is a shake correction component that corrects a shake occurring due to a vibration exerted on the imaging apparatus, and
the processor is configured to resolve the misregistration by operating the shake correction component.

6. The imaging support device according to claim 5,
wherein the processor is configured to cause the shake correction component to resolve the misregistration in accordance with a correction amount decided in accordance with an instruction received by a reception device.

7. The imaging support device according to claim 5,
wherein the processor is configured to display a correction amount required for resolving the misregistration by the shake correction component on a display portion.

8. The imaging support device according to claim 5,
wherein the processor is configured to control the shake correction component in accordance with a focal length of the imaging apparatus.

9. The imaging support device according to claim 5, wherein the processor is configured to resolve the misregistration by operating the shake correction component in a case where a focal length of the imaging apparatus is greater than or equal to a reference value.

10. The imaging support device according to claim 5, wherein the processor is configured to derive an actual correction amount that is required for resolving the misregistration by the shake correction component and corresponds to an imaging focal length used in imaging performed by the imaging apparatus, based on a reference correction amount required for resolving the misregistration by the shake correction component in a reference focal length decided as a focal length as a reference of the imaging apparatus and correlation information indicating a correlation between a focal length of the imaging apparatus and sensitivity of the shake correction component.

11. The imaging support device according to claim 10, wherein the processor is configured to cause the shake correction component to resolve the misregistration in accordance with the actual correction amount.

12. The imaging support device according to claim 10, wherein the actual correction amount is a value obtained by dividing the reference correction amount by a product of the sensitivity corresponding to the reference focal length and the sensitivity corresponding to the imaging focal length.

13. The imaging support device according to claim 5, wherein the shake correction component is at least one of an optical shake correction mechanism or an electronic shake correction component.

14. The imaging support device according to claim 13, wherein the optical shake correction mechanism is at least one of a lens moving type shake correction mechanism or an imaging element moving type shake correction mechanism.

15. An imaging apparatus comprising:
the imaging support device according to claim 1; and
an imaging element,
wherein the imaging support device supports imaging for the imaging element.

16. The imaging apparatus according to claim 15, wherein the adjustment component is a shake correction component that corrects a shake occurring due to a vibration exerted on the imaging apparatus, and
the imaging apparatus further includes a reception device that receives an instruction for a correction amount required for adjusting the position of the captured image by the shake correction component.

17. The imaging apparatus according to claim 15, further comprising:
a display,
wherein the processor is configured to display the correction amount required for adjusting the position of the captured image on the display.

18. An imaging system comprising:
the imaging apparatus according to claim 15; and
a control device that performs at least one of a control of displaying the captured image adjusted by the adjustment component on a display or a control of storing image data indicating the captured image in a storage device, under control of the processor.

19. An imaging support system comprising:
the imaging support device according to claim 1; and
the adjustment component,
wherein the processor included in the imaging support device is configured to control the adjustment component.

20. An imaging support method comprising:
acquiring reversal information indicating that a revolution direction of an imaging apparatus that is caused to revolve about one axis out of a first axis and a second axis intersecting with the first axis as a central axis by a revolution mechanism enabling the imaging apparatus to revolve about each of the first axis and the second axis as the central axis is reversed; and
performing, in a case where the reversal information is acquired, control for operating an adjustment component capable of adjusting a position of a captured image obtained by imaging performed by the imaging apparatus.

21. A non-transitory computer-readable storage medium storing a program executable by a computer to perform a process comprising:
acquiring reversal information indicating that a revolution direction of an imaging apparatus that is caused to revolve about one axis out of a first axis and a second axis intersecting with the first axis as a central axis by a revolution mechanism enabling the imaging apparatus to revolve about each of the first axis and the second axis as the central axis is reversed; and
performing, in a case where the reversal information is acquired, control for operating an adjustment component capable of adjusting a position of a captured image obtained by imaging performed by the imaging apparatus.

* * * * *